(12) United States Patent
Colton et al.

(10) Patent No.: US 8,850,416 B1
(45) Date of Patent: Sep. 30, 2014

(54) SYSTEM AND METHOD FOR CREATING TARGET BYTE CODE

(71) Applicant: Appcelerator, Inc., Mountain View, CA (US)

(72) Inventors: Paul Colton, Palo Alto, CA (US); Kevin Edward Lindsey, Fort Worth, TX (US); Roland Ingomar Muschenetz, San Diego, CA (US); Robin Sean Debreuil, Roseisle (CA)

(73) Assignee: Appcelerator, Inc., Mountain View, CA (US)

( * ) Notice: Subject to any disclaimer, the term of this patent is extended or adjusted under 35 U.S.C. 154(b) by 9 days.

(21) Appl. No.: 13/862,912

(22) Filed: Apr. 15, 2013

Related U.S. Application Data

(63) Continuation of application No. 12/955,881, filed on Nov. 29, 2010, now Pat. No. 8,423,953, which is a continuation of application No. 11/372,685, filed on Mar. 10, 2006, now Pat. No. 7,844,958.

(60) Provisional application No. 60/661,061, filed on Mar. 11, 2005, provisional application No. 60/663,484, filed on Mar. 18, 2005.

(51) Int. Cl.
*G06F 9/44* (2006.01)
*G06F 9/45* (2006.01)

(52) U.S. Cl.
CPC .......................................... *G06F 8/52* (2013.01)

USPC ........................................... 717/146; 717/145

(58) Field of Classification Search
CPC ......................................................... G06F 8/52
USPC ............................................................. 717/146
See application file for complete search history.

(56) References Cited

U.S. PATENT DOCUMENTS

| 7,614,052 | B2 * | 11/2009 | Wei ................................ 717/176 |
| 7,707,547 | B2 * | 4/2010 | Colton et al. .................. 717/118 |
| 7,844,958 | B2 * | 11/2010 | Colton et al. .................. 717/146 |
| 7,849,459 | B2 * | 12/2010 | Burkhart et al. ............... 717/174 |
| 7,882,429 | B2 * | 2/2011 | Heifets et al. .................. 715/237 |
| 2007/0294679 | A1 * | 12/2007 | Bobrovsky et al. ........... 717/146 |
| 2008/0127169 | A1 * | 5/2008 | Malasky et al. ............... 717/174 |
| 2010/0262952 | A1 * | 10/2010 | Colton et al. .................. 717/118 |

* cited by examiner

*Primary Examiner* — Don Wong
*Assistant Examiner* — Theodore Hebert
(74) *Attorney, Agent, or Firm* — Staniford Tomita LLP

(57) ABSTRACT

A system and method for converting byte code of a first type into byte code of a second type. Byte code of a first type and markup language code are received as inputs. The first byte code is converted into constituent byte code data elements that can comprise any logical unit or grouping of at least a portion of a software application. The markup language code is converted into constituent markup language data elements that can comprise individual markup language tags and references to data or functionality in the first byte code. The first byte code data elements and markup language data elements are mapped to data elements of a second byte code type. The second byte code data elements are assembled into a resulting second byte code.

1 Claim, 29 Drawing Sheets

SYSTEM AND METHOD FOR CREATING TARGET BYTE CODE

CROSS REFERENCE TO RELATED APPLICATIONS

The present application claims is a continuation of U.S. patent application Ser. No. 12/955,881 entitled "System And Method For Creating Target Byte Code," filed Nov. 29, 2010, now U.S. Pat. No. 8,423,953 which is a continuation of U.S. patent application Ser. No. 11/372,685 entitled "System And Method For Creating Target Byte Code," filed Mar. 10, 2006, now U.S. Pat. No. 7,844,958 which claims the benefit of priority to U.S. provisional application Ser. No. 60/661,061 entitled "System And Method For Creating Target Byte Code," filed on Mar. 11, 2005 and U.S. provisional application Ser. No. 60/663,484 entitled "System And Method For Creating Target Byte Code," filed on Mar. 18, 2005, all of which are hereby incorporated in their entirety by reference.

BACKGROUND OF THE INVENTION

1. Technical Field

The present invention relates generally to computer code, and more specifically to a system and method for improved conversion of computer code to target computer byte code of a second type.

2. Description of the Related Art

Traditionally, most computer programs comprised machine-dependent, system-level instructions. A program would be written in a higher level language (source code), such as C or C++, and converted into machine instructions (object code) that could be executed by a computer processor. While the resulting object code could be executed very efficiently, source code compiled on one computer architecture (for example, the Microsoft Windows® operating system environment on an Intel Pentium® processor-based computer system) could not subsequently run on a different architecture (such as an Apple Macintosh® operating system environment on a PowerPC™ processor-based computer system) (WINDOWS is a registered trademark of Microsoft Corp., PENTIUM is a registered trademark of Intel Corp., MACINTOSH is a registered trademark of Apple Computer, Inc., and POWERPC is a trademark of International Business Machines Corp.). To properly execute a program on different computer architectures, programmers typically undertook steps to re-compile source code for each target architecture. Additionally, machine-specific differences often required significant revision to the program's source code in order to even enable recompilation for a different architecture.

A modern innovation to this traditional method of compiling source code into machine-level object code is to use intermediate byte languages and byte code interpreters. Byte code (also known as "bytecode" or "byte-code") is a form of intermediate language that is typically more abstract than object code, but closer to machine language than a higher level language. Examples of languages that compile to byte code include Java™ from Sun Microsystems, Inc. and languages that target the Common Language Infrastructure (CLI) from Microsoft Corporation (JAVA is a trademark of Sun Microsystems, Inc.). A program that utilizes byte code is initially programmed in source code. The source code is then compiled into byte code. Compiled Java byte codes, for example, are typically in the form of ".class" or ".jar" files. The Common Language Infrastructure is an implementation of the Standard ECMA-335 specification. Source code written under the Common Language Infrastructure can be compiled to Common Intermediate Language (CIL) byte code. Common Intermediate Language byte code is typically packaged in a .Net Assembly, which can comprise Common Intermediate Language byte code, assembly metadata, type metadata and other resources. A .Net Assembly may be a standalone file or comprise multiple files. Metadata known as the assembly manifest describes how the elements in a given assembly relate to each other. Compiled byte code, whether standalone or contained in a larger package, can be interpreted by a byte code interpreter (also called a virtual machine) that translates the byte codes into machine level instructions. Examples of virtual machines include the Java Virtual Machine from Sun Microsystems and the Common Language Runtime (CLR), also called the Virtual Execution System, from Microsoft Corporation.

Thus, by way of example, a programmer using the Common Language Infrastructure can program an application in higher-level language such as Microsoft's C# or Visual Basic .Net and compile the program source code into Common Intermediate Language byte code and package it into a .Net Assembly. The resulting byte code can then be run in the CLR.

Typically, a virtual machine is available for different computer architectures. The virtual machine can take input from a program compiled in a standard byte code form and run the program on the native computer architecture in which the machine resides. Thus, in contrast to machine-specific object code, a byte code program can run in a virtual machine on any different architecture (that has a virtual machine) without a recompilation or reprogramming of the underlying source code. By way of example, a Java program compiled into byte code could run without modification in a virtual machine on both an Apple Macintosh computer and a Microsoft Windows computer.

During this same time, markup languages such as eXtensible Markup Language (XML) have gained popularity for their data description capabilities. Markup languages generally describe data and user interfaces as well as the details of the structure and appearance of both. Although most markup languages typically comprise ASCII text, markup language files may alternatively be serialized in a binary form, such as Microsoft's Binary extensible Application Markup Language (BAML). Markup languages such as HTML are well known for defining text and layout descriptions. Graphics markup languages such as the Scalable Vector Graphic (SVG) XML-based markup language can describe two-dimensional vector graphics. Scripting markup languages allow a programmer to add functional program code to markup language code that may then execute in a web server and dynamically output different markup language code. Exemplary scripting markup languages include Java Server Pages (JSP), Hypertext Preprocessor (PHP), Cold Fusion Markup Language (CFML) and Active Server Pages (ASP). For example, a programmer could create a web page comprised of mostly HTML tags and further including a CFML tag that inserted the current date and time every time the page was accessed. Upon access by a client web browser, the CFML code would execute and the web browser would receive an HTML page with the current date and time inserted as HTML data by the CFML code. Additionally, extensible languages such as XML allow programmers to define their own customized tags. This extensibility allows programmers to define, validate and interpret data exchanged between applications, even as the underlying data formats change over time.

When used in conjunction with functional programming language code, markup languages can be used inter alia to define the layout and appearance of objects in a program. For example, Microsoft's eXtensible Application Markup Language (XAML), an XML-based language, allows a programmer to define user interfaces and instantiate objects defined in Common Intermediate Language and contained in .Net Assembly packages. XAML and Common Intermediate Language code can be cross-referenced and executed by the Common Language Runtime. As an alternate example, XML User Interface Language (XUL) from the Mozilla Foundation is an XML-based language that can similarly describe the window layouts and user interfaces for modular software components written in languages including C, C++, and JavaScript using the Cross Platform Component Object Model (XPCOM) framework.

While byte code software applications, particularly when used in conjunction with markup language code, are quite useful and portable, one disadvantage of these approaches is that byte code of one type cannot be easily executed by a byte code interpreter of another type or converted efficiently to byte code of another type. Thus, although byte code may generally overcome machine-dependency, there is some level of dependency on a specific byte code interpreter application. Developers generally have to manually re-code applications for different byte code interpreters, which can be quite difficult in the case where source code is unavailable and only compiled byte code is on hand. Although some tools exist to disassemble compiled byte code into an assembly language or higher level language, a developer still has to port that source code to a different byte code language type in order to convert byte code of a first type into byte code of another type. In these respects, creation of target byte code according to the present invention substantially departs from the conventional concepts and designs of the prior art, and in doing so provides a system and method of byte code creation that is more flexible, robust and efficient than conventional byte code creation methods.

SUMMARY OF THE INVENTION

The present invention is directed toward a system and method for converting data of a first type into data of a second type. Preferably, in accordance with an embodiment of the present invention, byte code of a first type and markup language code can be converted into byte code of a second type. An example environment in which this embodiment can be applied is a computer system. For example, in this environment, a developer can run a byte code conversion software application taking byte code of a first type and markup language code as inputs and create byte code of a second type as output.

In accordance with an embodiment of the invention, byte code of a first type and markup language code can be converted into byte code of a second type. Byte code of a first type and markup language may be converted as part of the same process, as entirely separate processes, or as a process on one type of code which then calls the other. Byte code can comprise an intermediate code format that is typically lower-level than source code, but typically more abstract and machine-independent than object code. Examples of byte code include Common Intermediate Language, JAVA application or SHOCKWAVE FLASH ("SWF") byte code. Markup language code can refer to objects, data elements or other external information, as well as define layout and user interfaces for text and graphics. Markup language code may also associate markup language tags with objects in byte code of a first type or define a user interface for a software application in byte code of a first type. For example, a XAML, XML, or XUL markup language file could define a graphical user interface and associate objects in Common Intermediate Language byte code with the user interface. Markup language files may also be converted to a binary markup language format, such as BAML.

In an additional embodiment according to the invention, the first byte code type is the same as the second byte code type.

According to one aspect of the invention, markup language code may be transformed into a third byte code. In one embodiment, markup language code can be transformed into source code files of a byte code programming language. Exemplary source code languages include any of the Common Language infrastructure languages, and the Java and ActionScript programming languages. The source code can then be compiled into byte code of a third type or of the same type as the first source byte code or second target byte code. The new byte code and original source byte code are transformed into target byte code.

According to a further aspect of the invention, markup language code may be converted into an object graph that refers to data elements of the first byte code. An object graph is typically a directed graph or tree data structure consisting of related objects. An object graph can represent at least a portion of markup language tags and/or markup language references to byte code of a first type. In accordance with one alternative aspect of the invention, an object graph is created by parsing markup language code into an intermediate graph structure. An intermediate graph structure reflects the original structure of the source markup language code and is typically a tree structure.

According to another aspect of the invention, byte code of a first type may be optionally converted into an intermediate language format and/or an intermediate data structure. The intermediate data structure preserves and represents at least a portion of the semantics, syntax and metadata contained in the byte code of a first type. An intermediate data structure can be implemented, for example, as an abstract syntax tree or abstract semantic graph. According to an optional embodiment, an intermediate data structure may be created by disassembling byte code of a first type into an intermediate language format. Intermediate language format source code generally represents the lowest-level human-readable language that can be derived from the byte code and is typically in the form of ASCII text. For example, Common Intermediate Language compiled byte code can be disassembled into CIL Assembly Language source code (an intermediate language format). The intermediate language source code can then be parsed into an intermediate data structure. According to an alternative embodiment, higher-level source code can be converted directly into an intermediate data structure without first converting the source code into byte code. An object graph and byte code of a second type or intermediate data structure may be converted into byte code of a second type.

In accordance with another embodiment of the invention, byte code of a first type and markup language is converted into one or more constituent markup language data elements. Both markup language data elements and data elements of a first byte code type can be converted into data elements of a second byte code type.

The data elements of a first byte code type can be mapped to one or more data elements of a second type. Where a direct mapping of first to second byte code language formats is not possible or desired, one or more second byte code data elements can be combined and mapped in order to mimic the layout or functionality of the first byte code data element. The mapped data elements of a second type can be assembled into byte code of a second type. Data elements can include any logical unit or grouping that comprises at least a portion of a software application. Data elements may include, for example, objects, instructions, metadata, variables, classes, functions, methods, or groupings thereof. Optionally, data elements may comprise remote "stub" functions, which contain instructions to remotely connect to a network resource. For example, remote data elements may execute a method on a network resource not available in the byte code of a second type, or may connect to information stores like a relational database for information. Optionally, byte code of a first type may be converted into an intermediate data structure, as described above. The intermediate data structure may then be parsed into data elements of a first type. According to another aspect of the invention, the step of mapping data elements of a first type to data elements of a second type may reference one or more mapping libraries. A mapping library can contain instructions for mapping specific data elements of a first type to one or more data elements of a second type. A mapping library may comprise data structures such as hash tables, lookup tables, and/or arrays to facilitate efficient lookup and mapping of data elements.

Markup language data elements can include data structures defining colors, lines, shapes, text, and layout positions. Markup language data elements may additionally comprise references to, for instance, objects, functionality or data in a first byte code. Markup language data elements can be mapped to one or more data elements of a second byte code type, with or without reference to a first byte code or first byte code data elements. Data elements of a second byte code type and markup language data elements can be assembled into byte code of a second type. According to another aspect of the invention, as described above, byte code of a second type may be converted into an intermediate language format and/or intermediate data structure. A resulting intermediate data structure may be converted into data elements of a first type. Similarly, markup language code may be converted into an intermediate graph structure and/or an object graph. An object graph may then be converted into markup language data elements.

According to an aspect of the invention, bridging byte code of a second type may be inserted into byte code of a second type. During the data element mapping step, it is possible that not all of the first byte code or markup language data elements can be successfully matched and mapped to data elements of a second type. In this case, an embodiment of the present invention can insert additional byte code of a second type to replace or substitute missing data or functionality. The bridging byte code may be inserted automatically in response to the data element mapping process, according to one embodiment of the present invention. In an alternative embodiment, a developer or external software application may insert bridging byte code into byte code of a second type.

According to yet another aspect of the invention, one or more markup language mapping libraries may be referenced during the data element mapping process. A markup language mapping library is similar to a byte code mapping library and contains instructions for mapping markup language data elements to one or more data elements of a second type. A markup language mapping library and/or a byte code mapping library may be referenced during the step of converting markup language data elements and data elements of a first byte code type into data elements of a second byte code type.

In one exemplary embodiment of the invention, XAML markup language code is converted into markup language data elements, and Common Intermediate Language byte code is converted into byte code data elements. Common Intermediate Language data elements can include, for example, namespaces, types, attributes and members. These exemplary data element types can be discerned into further sub-categories of Common Intermediate data element types. Common Intermediate Language data elements can be mapped through various and alternative mapping steps to SWF data elements. The resulting SWF data elements can include SWF tags, records, action tags, and combinations thereof. SWF byte code can be created from one or more SWF data elements. The Common Intermediate Language data elements can be mapped to one or more SWF data elements. XAML data elements can include, for example, colors, brushes, pens, shapes, text, images, animation, transforms, sound, video, and controls. Further, because XAML is an extensible language, additional custom XAML data elements can be created. The Common Intermediate Language data elements and XAML data elements can be mapped through various mapping steps to SWF data elements. The mapping process may optionally cross-reference one or more XAML data elements to one or more Common Intermediate Language data elements. SWF data elements can be assembled into a SWF byte code.

According to another aspect of the invention, byte code files of a first type or source code and markup language of a first type may be stored as inline data in a wrapping markup language code of a second type. In one embodiment, the inline byte code and inline markup language code are extracted from the wrapping markup language code and converted into byte code of a second type. Alternately, inline source code and inline markup language code can be extracted from another wrapping markup language code and converted into a target second byte code.

According to an alternate aspect of the invention, byte code files of a first type and optionally markup language files of a first type may be converted into byte code of a second type and markup language of a second type. In an alternate embodiment according to the present invention, byte code files of a first type and optionally markup language files of a first type may be converted into source code of a second type and markup language of a second type. In yet another alternate aspect of the invention, byte code files of a first type and markup language files can be converted into byte code of a second type and media files such as image, audio, or video format files. Exemplary image file formats include Portable Network Graphics, Joint Photographic Experts Group, Graphics Interchange Format, or bitmap formats. Exemplary audio file formats include Audio Interchange File Format, MP3, WAVEform audio format, Windows Media Audio, Advanced Audio Coding, Ogg Vorbis, or Real Audio formats. Exemplary video file formats include QuickTime, MPEG, RealVideo, Audio Video Interleave, or Windows Media Video formats.

In one embodiment of the present invention, target byte code of a second type is transmitted across a network. The network can optionally comprise a peer-to-peer, server-client or other network topology. According to a further aspect of the invention, source byte code may be transformed into one or more byte code components of a second type on a network computer. When a network user requests byte code of a second type from the network computer, the computer can return target second byte code by creating new byte code components and/or reusing existing byte code components, and assembling all of the necessary components into byte code of a second type.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The present invention is directed toward a system and method for converting data of a first type into data of a second type. More specifically, according to one embodiment of the invention, a byte code converter is provided for a computer system, allowing a user or program to convert byte code of a first type and related markup language into byte code of a second, different type.

For example, according to one embodiment of the invention, byte code files and markup language files that contain references to data and objects in the compiled byte code are received. At least a portion of the compiled byte code is converted into one or more intermediate data structures. At least a portion of the markup language files are similarly converted into one or more object graph structures. The byte code converter can parse and examine these intermediate structures created from the original byte code and markup language, and map data elements from both to new byte code data elements of a different target type. As a result of the byte code conversion process, a new target byte code file can be produced. Various alternative methods can be used to convert byte code and markup language into intermediate data forms, as well as convert both the original byte code and markup language into target byte code of different types.

Figure 1:
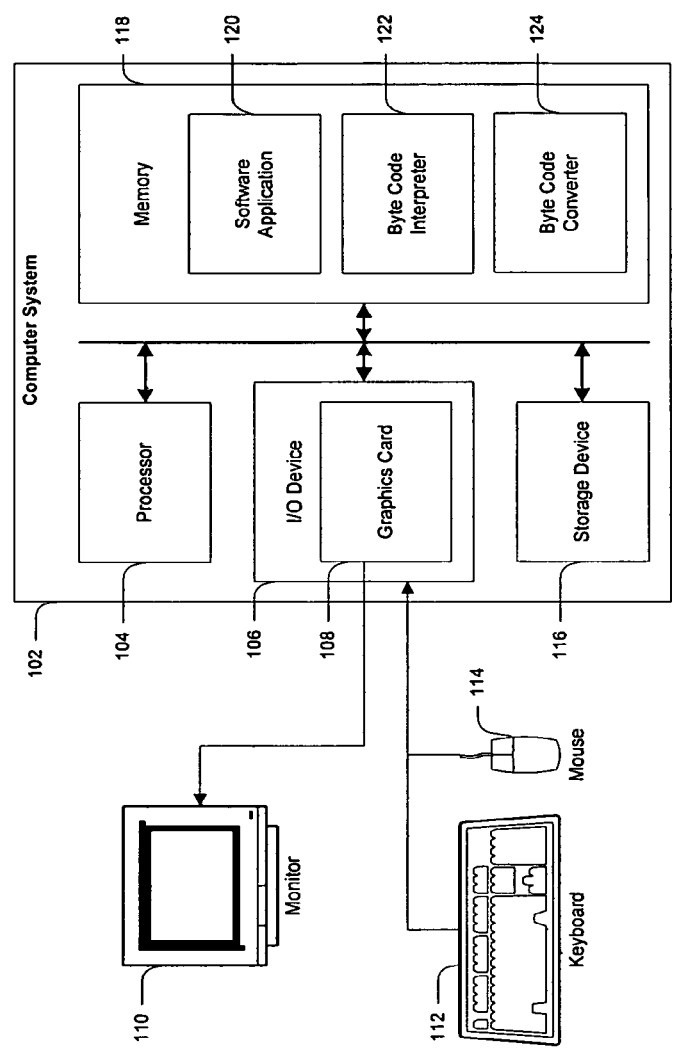
FIG. 1 is a diagram illustrating an exemplary computer hardware embodiment in which the present invention can be implemented.

FIG. 1 illustrates an exemplary computer hardware environment in which the present invention can be implemented. In this exemplary environment, a computer system 102 is comprised of one or more processors 104 connected to one or more electronic storage devices 116, such as hard disks, floppy disks, tape, CD-ROMs and other magnetic, optical, or other computer-accessible storage devices. Typically, one or more software applications 120, 122, or 124 are loaded by a processor 104 from a storage device 116 into memory 118, which is typically RAM, SRAM, or other computer-accessible memory device. The processor 104 can execute a software application 120, 122, or 124 by executing instructions stored in the software application 120, 122, or 124. Software applications can include executable programs such as a byte code interpreter 122 or a byte code converter software application 124 which performs at least a portion of instructions and processes in accordance with embodiments of the present invention. Input/output devices 106, such as graphic cards 108, keyboards 112, mice 114, disk controllers, network cards, or other computer-operable input/output devices may be included in the computer system. Input/output devices 106 may be used to relay signals and data during execution of a software application 120, 122, or 124 to and from the computer system 102 to peripheral devices such as external storage devices or other computers outside the computer system 102. Input/output devices 106 such as network cards may be used to connect to networks such as Local Area Networks (LANs), Wide Area Networks (WANs) or the internet. Typically, an input/output device 106 such as a graphic card 108 is used to connect a monitor 110 to the computer system 102, so that graphical and textual output from the execution of software applications 120, 122, or 124 may be viewed by a computer user.

Conventional software applications 120 can be stored as object code and comprise machine-specific instructions, which can be executed by a processor 104 on a specific computer system 102. For example, an object code software application 120 written for a computer system 102 with an Intel Pentium processor 104 and the Microsoft Windows operating system typically could not be executed by a different computer system 102 with a PowerPC G5 processor 104 and the Apple Macintosh operating system.

One approach to overcome this machine-specific dependency utilizes byte code. Byte code can be created by first programming a software application source code in a higher level language such as JAVA, C#, J#, or Visual Basic .Net. Source code is typically compiled into byte code. Byte code is an intermediate form of code that is created by reducing higher level source code commands into very basic language instructions. Nonetheless, byte code is more abstract than object code, contains additional metadata such as namespaces and classes, and most notably is generally not comprised of machine-specific instructions. Software applications in byte code form can be executed by a byte code interpreter 122.

A byte code interpreter 122 (also called a virtual machine) parses byte code files and translates the byte code operations into machine-specific instructions for a given computer system 102. The byte code interpreter 122 itself is typically stored and executed as object code, similar to a conventional software application 120. Thus, a separate byte code interpreter 122 must be created for each different computer system 102 architecture. The advantage to such a system is that software applications in byte code can then be executed without substantial modification on a byte code interpreter 122 for many different types of computer systems 102. Accordingly, byte code is much more portable than object code across computer systems 102. Thus, by way of example, because JAVA byte code interpreter applications 122 exist for both the Apple Macintosh and Microsoft Windows operating system environments, JAVA byte code that runs on an APPLE MACINTOSH JAVA byte code interpreter 122 should also run unmodified on a MICROSOFT WINDOWS JAVA byte code interpreter 122.

Although byte code software applications can contain all of the operations and instructions used to execute a full program in a byte code interpreter 122, other types of code can be used in conjunction with byte code files to provide a more extensible development environment. Byte code files can be used in conjunction with markup language files, where the markup language interacts with the byte code files to define user interface elements in a program. "Markup language" refers generally to types of languages that encode text to represent text, data and interfaces, as well as details of the structure and appearance of the text, data and/or interfaces. Examples of markup languages include SGML, HTML, XML, as well as any derived or related languages. For example, XUL and XAML are both XML-based markup languages. Markup languages may also be sub- or super-sets of other markup languages. For example, HTML is a subset of XML, which in turn is a subset of SGML.

In the present exemplary environment, the functional aspects and object definitions of a program can be written in a higher level language and compiled to intermediate byte codes. Markup languages can instantiate objects and data elements from the intermediate byte code, as well as define a user interface for the program. A byte code interpreter 122 can take both the byte code and markup language files and execute a program using the functional aspects of the byte code and display aspects of the markup language code.

The present invention is described in terms of this example environment. Description in these terms is provided for convenience only. It is not intended that the invention be limited to application in this example environment. Although particular computer systems and components are shown, those of ordinary skill in the art will appreciate that the present invention also works with a variety of other computers and components. Moreover, after reading the following description, it will become apparent to a person of ordinary skill in the relevant art how to implement the invention in alternative environments.

Although byte code is portable from a byte code interpreter on one computer architecture to a byte code interpreter on another, byte code of one type is conventionally not compatible with a byte code interpreter of another type. For example, a JAVA class file (compiled byte code) will run on its native runtime environment, the JAVA Virtual Machine (a byte code interpreter). However, a JAVA class file will not run without modification on the Macromedia Flash® Player (a different byte code interpreter) (FLASH is a registered trademark of Macromedia, Inc.).

Some systems allow a number of different source code files in different programming languages to compile to a single byte code file or set of related byte code files that run on a specific byte code interpreter. For example, the Common Language Infrastructure used in .Net allows software development in a set of higher-level source languages, such as Visual Basic .Net, Visual C++.Net, C# and J#. Source code in any of these languages can then be compiled into Common Intermediate Language byte code that will run on a specific runtime environment, the Common Language Runtime (a byte code interpreter). Other examples of source code languages include the JAVA programming language, which compiles to JAVA byte code and the Flash programming language, which compiles to SWF byte code. However, even in these systems, once compiled byte code is created the byte code is still tied to a specific byte code interpreter. Thus, similar to a JAVA class file, Common Intermediate Language byte code will not run on the Flash Player.

Currently, programmers may use "disassembler" programs to, in some cases, convert portions of byte code into more easily understood source code. Disassembled source code can be used in porting and reprogramming the code to a target byte code of a different type. However, such methods that presently exist are cumbersome and require significant additional programming to create a byte code of a different type. What is needed is a means of converting byte code of one type into byte code of another type, so that byte code programs can not only run on a variety of different computer system architectures, but run on a variety of different byte code interpreters as well.

Figure 2:
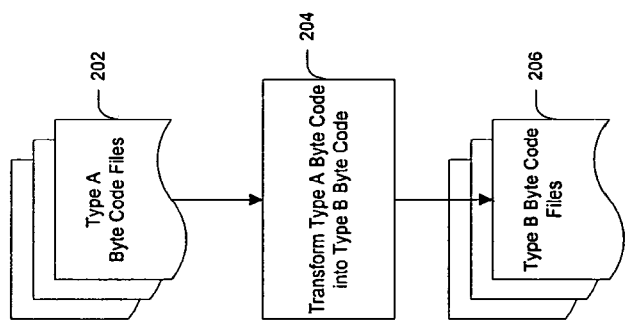
FIG. 2 is an operational flow diagram illustrating a method of converting byte code of a first type into byte code of a second type according to one embodiment of the invention.

FIG. 2 is an operational flow diagram illustrating a method of converting byte code of a first type into byte code of a second type, according to one embodiment of the present invention. Referring now to FIG. 2, byte code files of one type 202 are converted in a transformation step 204 into byte code files of a different type 206. In an exemplary embodiment, Common Intermediate Language byte code 202 contained in a .Net Assembly is converted in a transformation step 204 into a SWF byte code file 206, wherein at least some of the objects, data, functions and structures of the byte code and metadata in the .Net Assembly are converted into SWF data elements, typically called "tags." SWF is a tag-based file format displayed using the Flash Player. SWF tags can generate or reference vector graphics, animations, display information and other functionality during execution by the Flash Player. The set of SWF data elements can comprise types, tags, records and actions which in embodiments in accordance with the present invention can represent objects, data and structures from Common Intermediate Language byte code files 202 within a .Net Assembly. In alternate exemplary embodiments, compiled Java byte code 202 is converted into SWF byte code 206 or Common Intermediate Language byte code 206. Several additional methods of converting byte code of a first type into byte code of a second type will be explained in more detail below, and will become apparent to one of ordinary skill in the art from this description.

Figure 3:
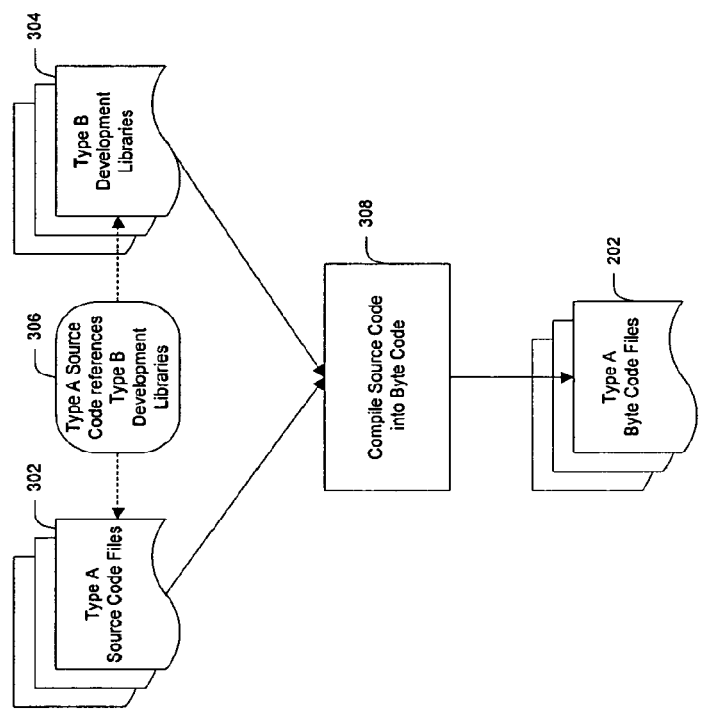
FIG. 3 is an operational flow diagram illustrating a method of developing source code of a first type against development libraries of a second type to produce compiled byte code of a first type according to one embodiment of the invention.

FIG. 3 is an operational flow diagram illustrating a method in accordance with one embodiment of the present invention of developing source code of a first type 302 with references to development libraries of a second type 304 and producing byte code of a first type 202. As previously explained, source code 302 is typically compiled in a compiling step 308 into byte code 202. Exemplary source code languages include Java, Flash, or any Common Language Infrastructure language. It should be further noted that although Microsoft's implementation of the Common Language Infrastructure is detailed herein, methods and aspects in accordance with the present invention would similarly apply to any other implementation of a Common Language Infrastructure according to the ECMA-335 specification. Development libraries 306 provide data structures, instructions and subroutines in a source code language of a first type that are already known to be capable of conversion to byte code of a second type. A developer programming source code 302 with references 306 to data, types and functions in development libraries 306 can create a first byte code 202 that should substantially map to a second byte code 202 for each data structure, type or function reference built on top of the development libraries 304. Although the development libraries 304 are not required for other embodiments of the present invention, they are useful tools when the target second byte code type is known at development time.

Referring again to FIG. 2, in one embodiment of the present invention, the byte code transformation step 204 is performed by referencing table structures within the source byte code 202. Many forms of byte code 202, 206, such as CIL byte code 202, 206, contain data such as class definitions and types that can be stored in table structures, such as tables, arrays or indexes. One or more table structures in the first byte code 202 can be mapped to one or more table or array structures in the second byte code 206. The mapping of data elements from a first byte code 202 to data elements from a second byte code 206 is described in more detail below and illustrated in FIGS. 7-9. In one configuration, the second byte code 206 table structure can be substantially similar to that in the first byte code 202. In an alternate configuration, the second byte code 206 table structure can be different than that in the first byte code 202. For example, CIL source byte code files 202 can contain multiple tables for data elements such as methods, types and classes. In a transformation step 204, the data in the multiple tables from the CIL source byte code 202 can be stored in rows or "slots" within a single global type array in a target SWF byte code file 206. Even different types of rows from multiple tables in CIL source byte code 202 can be stored in a single heterogeneous table in SWF target byte code 206. Thus, instead of reflecting the multiple table structure of the source CIL byte code 202, the resulting SWF byte code 206 hones down all class and type references to a single array, or lesser number of arrays. In another example, JAVA source byte code 202 can contain multiple table structures for classes in different JAVA class files. Similarly, these table structures can be pared down to less tables upon conversion to a byte code of a second type 206. By using fewer table structures than the source byte code 202, the target byte code 206 can be smaller in size and data and objects are more quickly located within a single or limited number of tables, instead of constantly cross-referencing a great number of tables. Moreover, in one configuration, data and objects unused by the target byte code 206 can be omitted from the destination byte code 206 table structure.

Additionally, instantiated objects in many byte code languages, such as those compiled from ECMA scripting languages like ActionScript, JavaScript, or JScript can also be referenced as arrays/tables. Thus, one or more global table structures according to the invention can reference instantiated object methods in array notation, such as "object[23]( )" instead of a name-based lookup, such as "object.MethodCall( )". Additionally, in one exemplary embodiment according to the invention, metadata for an object in source byte code 202 such as the visibility of types and members (private, public, etc.) and custom defined attributes can be stored in an array for the corresponding object in the target byte code 206. The metadata can similarly be referenced by index to the metadata array, and external references to elements of the metadata array can be stored in a global table structure.

In a further configuration, numerical indexes in the destination table structure can be referenced for types and classes in the target byte code 206. Conventionally, data and objects such as classes, members, types, local variables and arguments are stored as string literals in byte code 202, 206 and then looked up at execution time. Conventional systems create additional byte code for each different class, increasing the amount of memory used for storage and the amount of data that must be parsed for lookups. Moreover, if a class namespace comprises multiple sub-classes, such as "My.Long.Namespace", then a lookup for the type information of the class must execute individual computer instructions for "My", "Long", "Namespace" and "Type". By contrast, if the type information "My.Long.Namespace.Type" was stored in an array index, such as "223", then only one instruction to array address "223" would be required for the same type lookup. The present embodiment according to the present invention can replace these inefficient string lookups with a fast index or offset lookup for the data or object. Another advantage of the present embodiment is that method and constructor overloading instructions in the source byte code 202 can be converted into a more efficient implementation in the target byte code 206. Conventionally, overloaded methods and constructors programmed in object-oriented languages require inefficient namespace lookups up the chain of parent objects to find the computer instructions and data to execute the method or constructor. In the present embodiment according to the invention, overloaded methods and constructors simply occupy a different array index than the parent method or constructor, allowing a single lookup instruction to find the method or constructor.

Additionally, because data elements such as class members and variables can be stored in, for example, a single table, operations or methods performed on multiple data elements can often be performed in a single table operation, as opposed to individual byte code instructions. For example, if CIL source byte code 202 contained instructions to set twenty variables to zero upon execution, the conversion process could create SWF target byte code 206 containing a table structure further containing all twenty variables. Instead of executing multiple byte code instructions to set each variable to zero, the SWF target byte code 206 could contain one byte code instruction to set the twenty rows in the table structure representing the variables all to zero in a single table loop operation.

In another embodiment of the present invention, identifying strings such as class names can be removed because an index is used for all data elements and objects. Class names in byte code can be used to discover portions of the structure and functionality of the instructions in byte code files 202, 206. Removing such strings allows the target byte code 206 to be obfuscated, making it more difficult for end users to decompile, disassemble or reverse engineer.

Figure 4:
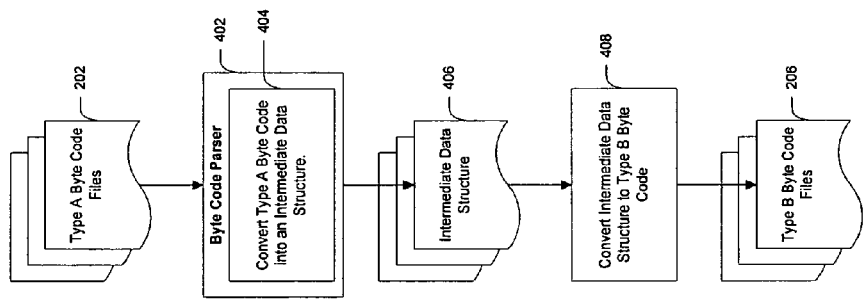
FIG. 4 is an operational flow diagram illustrating a method of converting byte code of a first type into an intermediate data structure and converting the intermediate data structure into byte code of a second type according to one embodiment of the invention.

An alternate embodiment according to the invention to the table/array conversion method is illustrated in FIG. 4. FIG. 4 is an operational flow diagram illustrating one method in accordance with the present invention of converting byte code of a first type 202 into an intermediate data structure 406, which is then converted into byte code of a second type 206. In one embodiment, byte code files of a first type 202 are received by a byte code parser 402 and converted in a converting step 404 into an intermediate data structure 406. Alternately, in another embodiment according to the present invention, source code files of a first type can be compiled directly into an intermediate data structure. The intermediate data structure 406 in these embodiments preserves and represents at least a portion of the semantics, syntax and metadata contained in a compiled byte code 202 in an organized structure. An intermediate data structure 406 can be implemented as a graph data structure, such as an abstract syntax tree or abstract semantic graph. Examples of intermediate data structures 406 formed as graph data structures include implementations of the Document Object Model (DOM) from the World Wide Web Consortium (W3C) in languages such as XML or HTML. In a converting step 408, the intermediate data structure 406 is converted into byte code of a second type 206. In the embodiment illustrated in FIG. 4, the converting step 408 is carried out by a byte code parser 402 that reads the byte code files 202 directly and parses out the data elements into an intermediate data structure 406. Further details and alternative embodiments of the conversion from intermediate data structure 406 to byte code 206 are provided below.

Figure 5:
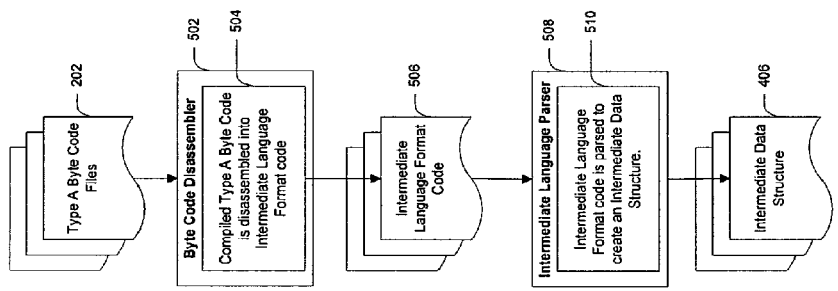
FIG. 5 is an operational flow diagram illustrating a method of converting byte code to intermediate language format code, and parsing the intermediate language source code to create an intermediate data structure according to one embodiment of the invention.

One method of creating an intermediate data structure 406 is illustrated in FIG. 5. FIG. 5 is an operational flow diagram illustrating a method in accordance with one embodiment of the invention of disassembling byte code files 202 into an intermediate language format 506, which is parsed to produce an intermediate data structure 406. Byte code files 202 are typically in binary format, and thus are not easily read by human programmers or software applications, aside from byte code interpreters. However, byte code files 202 can be changed into an intermediate language format 506, which generally comprises a much more comprehensible and structured format than pure byte code. The phrase "intermediate language format" generally refers to the lowest-level human-readable language that can be derived from a byte code file 202 (typically intermediate language source code) and includes code in ASCII text format. Compiled byte code 202 can often be changed to and from intermediate language source code 506. For example, the Common Language Infrastructure allows source code in higher-level languages to be compiled into Common Intermediate Language, which contains representations of the Common Language Infrastructure processing instructions as defined by ECMA-335 specification. Common Intermediate Language byte code can take digital forms including a source representation known as CIL Assembly Language and a binary representation as byte codes. CIL Assembly Language is one example of an intermediate language format 506 according to aspects of the present invention and it textually represents the data and functionality in .Net Assembly and Common Intermediate Language byte code. As implied by the "Common" in Common Intermediate Language, analogous programs written in different higher-level languages should compile to fairly similar Common Intermediate Language byte code. Common Intermediate Language is an object-oriented language and has a stack-based structure. Common Intermediate Language byte code is typically packaged in a .Net Assembly file. Both Common Intermediate Language binary byte code and .Net Assemblies can be assembled from, as well as disassembled into, constituent CIL Assembly Language source code.

Byte code files 202 can be converted into intermediate language files 506 in a disassembly step 504. In one embodiment according to the invention, byte code files 202 can be disassembled by a byte code disassembler 502 into intermediate language formats 506. Intermediate language source files 506 are examined in a parsing step 510 for structure and content that is used to create an intermediate data structure 406 that preserves the syntax and attributes of the underlying compiled byte code 202 and intermediate language source code 506. In a preferred embodiment, the parsing step 510 can be carried out by an intermediate language parser 508, which is a software application that can read intermediate language source code 506 and produce an intermediate data structure 406. The resulting intermediate data structure 406 is then converted to byte code 206 as explained previously and detailed further below.

Figure 6:
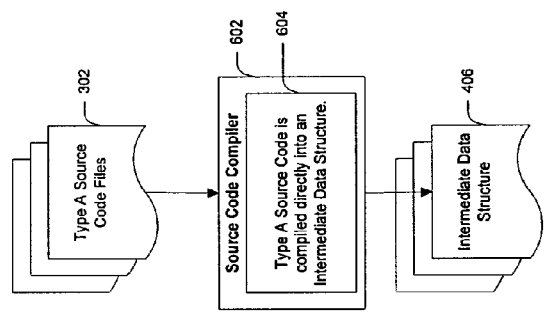
FIG. 6 is an operational flow diagram illustrating a method of converting source code into an intermediate data structure according to one embodiment of the invention.

An alternative method of creating an intermediate data structure 406 is shown in FIG. 6. FIG. 6 is an operational flow diagram illustrating a method in accordance with the present invention of converting higher-level source code files 302 into an intermediate data structure 406. The phrase "source code" refers to computer programs or instructions written in a human-readable language format that, in some cases, loosely resembles human spoken language. Source code files 302 are typically composed of ASCII text and are often compiled into machine-specific or intermediate code formats to actually execute as programs. Higher-level source code 302 is typically compiled into byte code of a corresponding (or "native") type. For example, JAVA source code is natively compiled by the JAVA Compiler into JAVA byte code. Some development frameworks also allow multiple source languages to be natively compiled to a single type of byte code. For example, as described previously, any source code language within the Common Language Infrastructure can be compiled into Common Intermediate Language byte code. In contrast to these approaches, as shown in FIG. 6, a source code compiler 602 can compile source code files 302 directly into an intermediate data structure 406 in a compiling step 604 without converting the source code 302 into byte code of a corresponding type. For example, source code written in C# programming language could be compiled directly into an abstract syntax tree without ever directly converting the code to Common Intermediate Language byte code or packaged code in a .Net Assembly.

Figure 7:
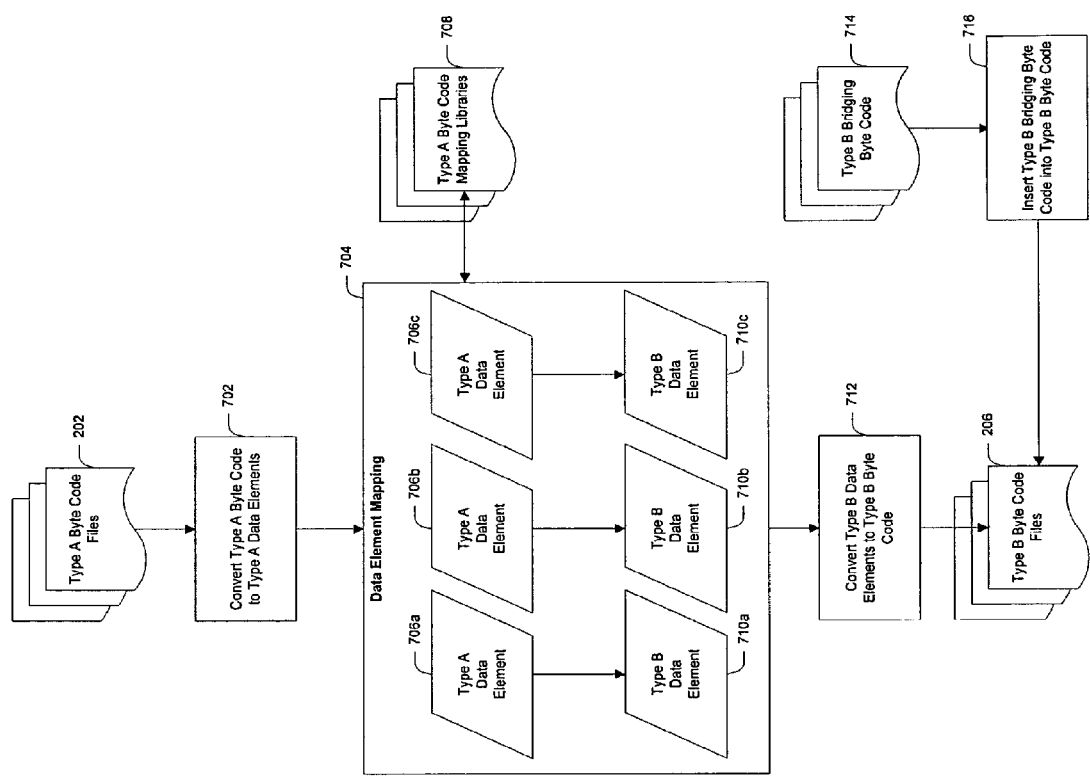
FIG. 7 is an operational flow diagram illustrating a method of converting byte code of a first type into byte code of a second type by mapping data elements from byte code of a first type to data elements from byte code of a second type according to one embodiment of the invention.

One method of converting byte code of a first type 202 into byte code of a second type 206 is explored in further detail in FIG. 7. FIG. 7 is an operational flow diagram illustrating a method in accordance with one embodiment of the present invention of mapping data elements 706a-c from a first byte code 202 to data elements 710a-c of a second byte code 206. Byte code files 202 are converted into data elements 706a-c in a converting step 702. As used herein, the phrase "data element" refers to any logical unit or grouping that comprises a part or portion of a software application. For instance, data elements 706a-c, 710a-c can include any objects, instructions, metadata, variables, type definitions, classes, functions, or groupings thereof, within a computer program. Sources such as byte code 202, 206 and markup language code may be comprised of one or more data elements. As an example, the data elements 706a-c of Common Intermediate Language byte code 202 include namespaces, types, members, fields, constants, events, properties, indexers, methods, constructors and Common Intermediate Language opcodes. Moreover, each instance and type of Common Intermediate Language opcode could comprise individual data elements 706a-c for the purpose of mapping. In a mapping step 704, byte code of a first type 202 is parsed into its constituent data elements 706a-c. At least a portion of data elements of a first type 706a-c can be mapped to data elements of a second type 710a-c. For example, a data element comprising an instruction to create an object in Common Intermediate Language byte code in a .Net Assembly could be mapped to an instruction to create a substantially equivalent object in SWF byte code. Using the results of the mapping step 704, data elements of a second type 710a-c can be assembled into the resulting byte code of a second type 206 in a converting step 712.

Exploring the data element mapping step 704 in further detail, mapping step 704 is carried out in one embodiment in accordance with the present invention by referencing byte code mapping libraries 708. The byte code mapping libraries 708 can contain computer instructions or subprograms that take as input a data element of a first byte code type 706a-c, determine if any mapping exists from the data element of a first type 706a-c to one or more data elements of a second type 710a-c, and return information indicating appropriate data elements of a second type 710a-c or a status message indicating that no mapping was found. In one embodiment of the invention, a byte code mapping library 708 for mapping Common Intermediate Language data elements to SWF data elements could, for example, map the Common Intermediate Language opcodes to the SWF actions and return information indicating the designated SWF action.

The byte code mapping libraries 708 can be implemented, for example, as statically linked, dynamically linked, or remote libraries. The byte code mapping libraries 708 may comprise one or more reference data structures to facilitate the process of matching data elements of a first type 706a-c to data elements of a second type 710a-c, including for example, structures such as lookup tables, hash tables, associative arrays or arrays. In one preferred embodiment in accordance with the present invention, the byte code mapping libraries 708 contain a lookup table. The lookup table in this embodiment can index input values of data elements of a first type 706a-c to stored return values of data elements of a second type 710a-c. By using a data structure such as a lookup table, one of ordinary skill in the art could increase the speed and efficiency with which the data element mapping step 704 is carried out.

When converting between byte code 202, 206 based in similar languages, such as C# and Java, the data elements 706a-c, 710a-c between the source byte code 202 and target byte code 206 should substantially map in nearly a 1:1 ratio. Thus, the data element mapping process can be relatively straightforward to perform for languages that contain analogous objects, classes, members, types and other data elements. A more difficult situation is presented when the source and target languages differ substantially in available data elements 706a-c, 710a-c. For example, as described below in more detail and illustrated in FIGS. 8a and 8b and FIGS. 9a and 9b, heterogeneous byte code source languages, like .Net and SWF, often lack single, analogous data elements 706a-c, 710a-c between the two languages. Thus, in the case of heterogeneous byte code conversion, the data element mapping step 704 can map a first data element 706a-c to a second data element 710a-c that has been created to mimic an analogous data element in the destination byte code language or format. For example, if a first data element 706a-c has no direct matching data element 710a-c in the destination language, then one or more second data elements 710a-c (such as methods, types, etc.) can be assembled to mimic the behavior or appearance of the first data element 706a-c. For example, a source CIL method call data element 706a-c could be mapped to one or more destination SWF stack instruction data elements 710a-c. In this case, the data elements aren't exactly analogous, but both exhibit the same functionality. Alternately, first data elements 706a-c may be mapped to remote second data elements 710a-c, eliminating the need for analogous specific second data elements 710a-c to map to, as described in further detail below and illustrated in FIGS. 21 and 22. Additionally, some first data elements 706a-c may not be necessary in the target byte code 206, and can safely be ignored in the mapping step 704. For example, a source CIL byte code 202 may contain a data element 706a-c that is a byte code instruction for a string conversion method. When converting to a target SWF byte code 206, the data element mapping step 704 can be configured to ignore the string conversion data element 706a-c because the SWF language and byte code interpreter automatically converts any data used as a string to a string format.

With further reference to FIG. 7, additional embodiments in accordance with the present invention can aid the conversion step 712 by inserting bridging byte code of a second type 714. As previously described, not all byte code languages will have data elements that entirely match up to data elements of other languages. Moreover, during the mapping step 704, it might not always be possible to map a first data element 706a-c to a contrived second data element 710a-c, internally comprised of two or more second data elements 710a-c. In such a case, the computer-implemented process carrying out the data element mapping 704 and/or the second byte code conversion 712 could abort the byte code conversion operation. Alternately, the process may just ignore the data elements of a first type 706a-c that could not be mapped and assemble a second byte code 206 from the collection of second data elements 710a-c that were successfully mapped. However, the resulting second byte code 206 from the latter exemplary scenario could potentially lack portions of data and/or functionality from the first byte code 202 due to the ignored data elements 706a-c.

One solution to such a scenario is found in embodiments of the present invention that insert bridging byte code of a second type 714 into the second byte code 206 in an inserting step 716. In one embodiment according to the present invention, in the case that not all first data elements 706a-c are mapped to second data elements 710a-c during the mapping step 704, bridging byte code 714 is generated automatically by a computer-implemented process in response. The process that automatically inserts bridging byte code 714 could be part of the same software application or applications performing the byte code conversion process, or the process could be embodied in an external software application. For example, in the case that not all first data elements 706a-c are mapped, an external software application could be called to examine unmapped first data elements 706a-c or the resulting second byte code 206. A bridging second byte code 714 could be created in response to enhance the functionality of the second byte code 206 and/or compensate for lost data or functionality in the second byte code 206. The generated bridging byte code of a second type 714 is inserted into said second byte code 206 in an inserting step 716.

In an alternate embodiment of the present invention, custom bridging byte code 714 could be inserted by an external computer program or by a programmer. In this embodiment, for example, a computer programmer familiar with the first byte code 202 could examine the second byte code 206 and discover any data or functionality lost in one or more of the conversion steps 702, 704, 712. The programmer could then program and compile custom bridging byte code of a second type 714 and insert this code into the target byte code 206. Thus, the optional step of inserting bridging byte code 716 can enable embodiments of the present invention to overcome inherent structural differences between different byte code languages and may permit developers more control than they would otherwise have over the conversion process.

In addition, a base set of bridging byte code 714 can be inserted to provide additional functionality to the target byte code 206. Even in the scenario where all data elements 706a-c, 710a-c have been successfully mapped, ignored or substituted, additional functionality not present in the first byte code 202 may be desired for the second byte code 206. For example, if it was desirable to have an added information dialog window available in all target byte code 206 for a given software application, bridging byte code 714 containing byte code instructions for a dialog window could be inserted, even if the original source byte code 202 contained no such dialog window.

With reference to FIGS. 4 and 7, an intermediate data structure 406 may be used in embodiments in accordance with the present invention to facilitate the step 704 of mapping data elements of a first type 706a-c to data elements of a second type 710a-c. As previously described, at least a portion of byte code of a first type 202 is parsed in a parsing step 402 into an intermediate data structure 406. Portions of the graph data structure comprising the intermediate data structure 406 may be further processed into data elements of a first type 706a-c. Because exemplary intermediate data structures 406 typically have a graph or hierarchical object structure, each object within the intermediate data structure 406 is a logical unit of data and the relationships between objects facilitates grouping families of objects. Accordingly, these logical units and/or groupings of objects in an intermediate data structure 406 facilitate converting step 702 by presenting the underlying data of a first byte code 202 in a discernible and differentiable structure that may more easily be parsed. The resulting data elements 706a-c can be mapped to data elements of a second type 710a-c and assembled into byte code of a second type 206, as previously described. For example, Common Intermediate Language byte code files 202 could be parsed along with other files in a .Net Assembly into an XML DOM intermediate data structure 406, wherein XML tags represent at least some of the semantics, syntax and structure of the .Net Assembly. Each XML tag or hierarchical group of tags in the XML DOM intermediate data structure 406 could be processed, from which some or all could be mapped to SWF action or tag byte code instructions and assembled into a SWF byte code file 206.

Figure 21:
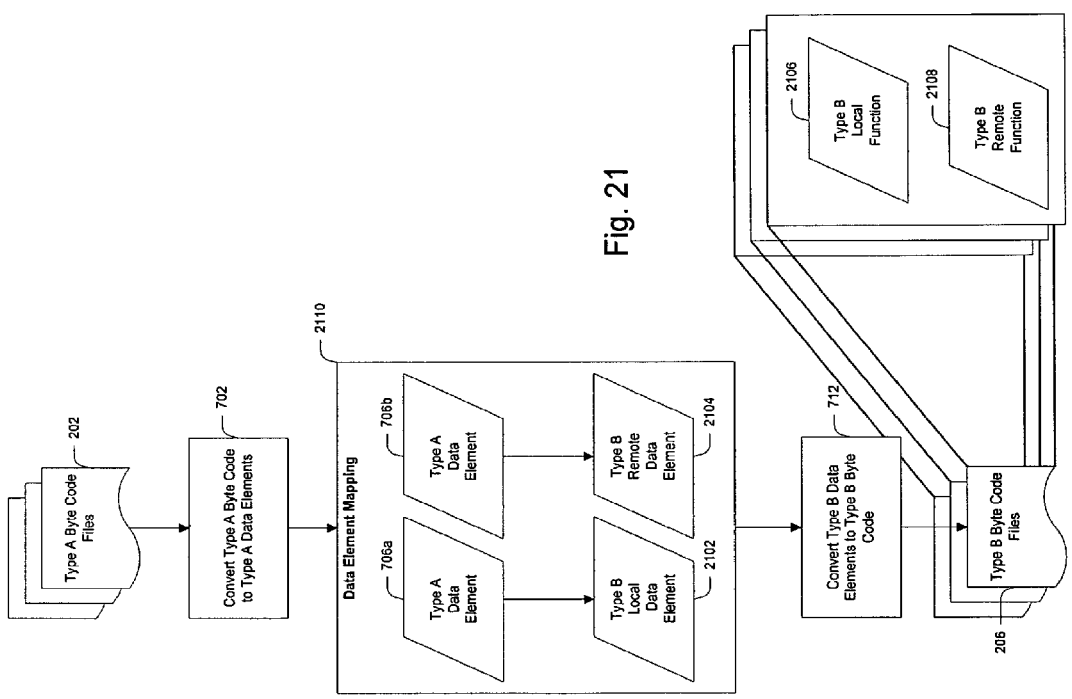
FIG. 21 is an operational flow diagram illustrating a method of converting byte code of a first type into byte code of a second type containing local and remote functions by mapping data elements from byte code of a first type to local and remote data elements from byte code of a second type according to one embodiment of the invention.

Yet another embodiment according to the present invention that addresses complexities during a mapping step is presented in FIG. 21. FIG. 21 is an operational flow diagram illustrating a method in accordance with one embodiment of the present invention of mapping data elements 706a-b to data elements 2102 and 2104 of a second byte code 206. Byte code files of a first type 202 are converted to data elements of a first type in a converting step 702. Similar to the method illustrated in FIG. 7, data elements of a first type 706a and 706b are mapped to data elements 2102 and 2104 of a second type in a mapping step 2110. However, a mapping step 2110 can map at least a portion of data elements of a first type 706a to local second data elements 2102. Local data elements 2102 include data elements, functionality, objects or information that are natively included in a destination byte code language. For example, if a first byte code 202 comprising Common Intermediate Language byte code included a data element 706a comprising the stack "push" operation, the data element 706a could be mapped to a local data element 2102 in SWF which similarly comprises a "push" operation. The "push" operation is natively included in the SWF byte code language. A mapping step 2110 can also map at least a portion of first data elements 706b to remote data elements of a second type 2104. Remote data elements 2104 include data elements, functionality, objects or information that are not natively included in a destination byte code language, but may be available from network resource. For example, if a first byte code 202 comprising Common Intermediate language byte code included a data element 706b comprising a regular expression operation, the data element 706b could be mapped to a remote second data element 2104 in SWF in the case that the SWF language did not natively implement regular expressions. The remote second data element 2104 could contain SWF instructions for connecting to one or more network resources to access regular expression functionality. Like the embodiment illustrated in FIG. 7, a byte code mapping library 708 can be used to map first data elements 706a-b to local and remote data elements 2102 and 2104, respectively. The byte code mapping library 708 of FIG. 7 can further contain instructions indicating whether a given data element 706a-b should be converted to a local or remote data element. Turning back to FIG. 21, external data or information can optionally or additionally be used to determine whether a local or remote data element of a second type is appropriate during the mapping step 2110. Optionally, external data can include data or information stored in an entirely separate file. Or, external data could, for example, include data or information that is part of the same greater file containing both the external data and first byte code 202. For example, metadata contained in a .Net Assembly comprising Common Intermediate Language byte code could be used, in part or in whole, to determine whether a given Common Intermediate Language data element 706a-b should be mapped to one or more local or remote SWF data elements 2102 and 2104. In step 712, local and remote data elements of a second type 2102 and 2104 are assembled into byte code of a second type 206. The second byte code 206 contains both local functions 2106 and remote functions 2108. Local functions 2106 can include functions, methods, or operations that are native to the second byte code language. Remote functions 2108 can include functions, methods, or operations that are not native to the second byte code language. Remote functions 2108 can act as stubs or proxies to connect to one or more network resources that can execute the desired function and then return the result to the calling second byte code 206 at runtime.

Figure 22:
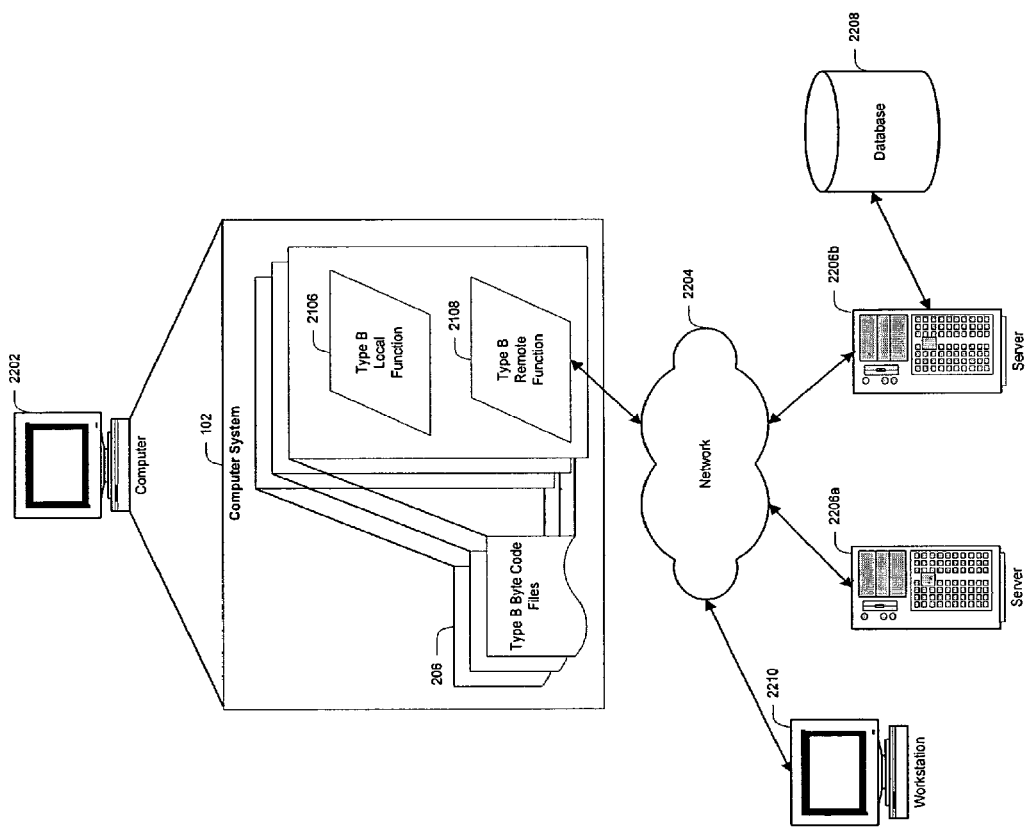
FIG. 22 is a diagram of a computer system containing second byte code that further contains local functions and remote functions that can connect to network resources according to one embodiment of the invention.

One method of invoking a remote function in transformed second byte code is illustrated in FIG. 22. FIG. 22 is diagram of a computer 2202 comprising a computer system 102 containing a second byte code 206 according to one embodiment of the present invention. The second byte code 206 can contain both local functions 2106 and/or remote functions 2108 created as described above for FIG. 21. Returning to FIG. 22, when local functions 2106 are called from the second byte code 206, the functions can be executed natively in a second byte code language on the computer system 102. When remote functions 2108 are called from the second byte code 206, the functions can connect to one or more computers 2206a-b and 2210 across a network 2204 to execute a function on that computer. Examples of a network 2204 can include LANs, WANs or the internet, and topology of the network 2204 can include client-server, peer-to-peer or other network configurations as would be apparent to one of skill in the art. Remote functions can connect to one or more server computers 2206a-b, as well as other types of computers, including workstations 2210, laptops and other peer computers. Once a remote function has connected to a computer 2206a-b, 2210, the computer 2206a-b, 2210 can perform a requested function or operation, retrieve data or invoke other computer processes. The computer 2206a-b, 2210 can then optionally return a response to the remote function 2108. Continuing a previous exemplary scenario, if a converted SWF byte code application 206 contains a remote function 2108 for a regular expression operation, the remote function 2108 can connect to a server 2206a that implements the desired regular expression operation in Common Intermediate Language (the original source byte code language), or any additional compiled or byte code language which implements the desired functionality. The server 2206a can then optionally return a response, such as text that matched the sought regular expression, to the calling SWF remote function 2108. One advantage of utilizing both local and remote data elements and constituent functions, as illustrated in FIGS. 21 and 22, is that missing functionality or data from the transformation process can be substituted with analogous remote functionality, which can allow the target second byte code to behave in a similar fashion to a fully native application comprising a second byte code.

It should be noted that the embodiment according to the present invention illustrated in FIG. 22 is not limited in application to those scenarios where a first byte code cannot completely map to a second byte code. Additional scenarios where it may be desirable to map data elements of a first type to remote data types of a second type 2108 include situations where sensitive data or information should not be present in a local byte code file 206. For example, if a first byte code contains a database connection function, the username and password may be stored in the first byte code and retrievable by skilled computer programmers. One embodiment according to the present invention could take data elements of a first type containing such sensitive database information and map the data elements to remote data elements of a second byte code type. For example, in the case that a second byte code 206 executes a database call, a remote data function 2108 can connect to a remote server 2206b. The remote server 2206b can securely store the database username and password, and use it to retrieve data from the database 2208 directly. The remote server 2206b can return the database results to the remote function 2108 without the second byte code 206 ever storing the database username and password. Thus, another useful aspect of the present invention is the ability to keep sensitive information away from target byte code applications 206 that can potentially be compromised.

Figure 8A:
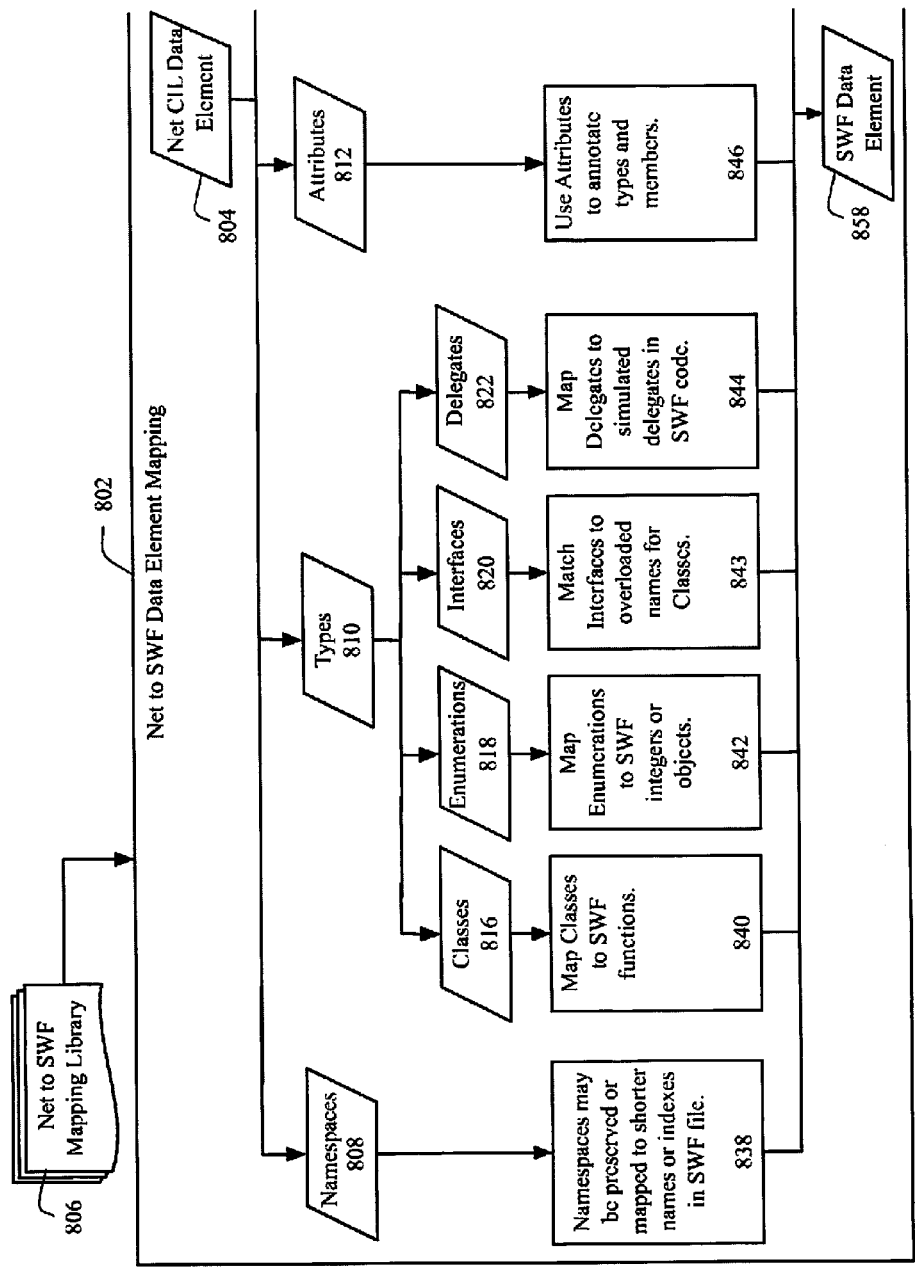
FIGS. 8a and 8b together illustrate an operational flow diagram of one embodiment in accordance with the present invention where a data element mapping step is illustrated in further detail with the mapping of Common Intermediate Language byte code data elements to data elements of SWF byte code.
Figure 8B:
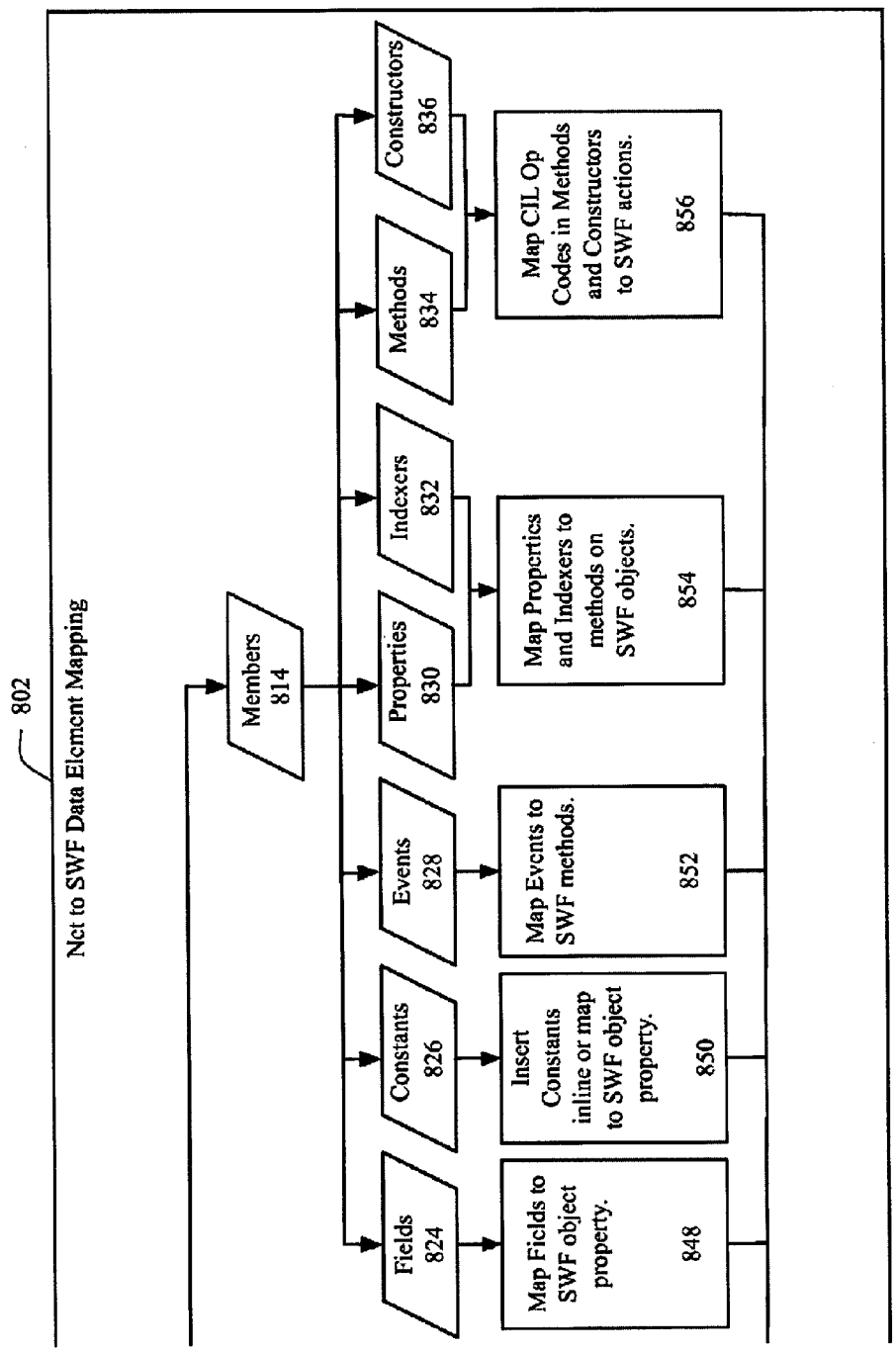

FIGS. 8a and 8b, together, further illustrate the data element mapping step 802 in accordance with one embodiment of the present invention. In the mapping step 802, an exemplary Common Intermediate Language data element 804 is mapped to a SWF data element 858. The mapping step 802 can optionally reference mapping instructions contained in a byte code mapping library 806 as described previously. Or, alternately, the mapping step 802 can be carried out with instructions and functionality in the native software application carrying out the mapping step 802.

Common Intermediate Language data elements 804 can be broken down into several sub-types including, for example, namespaces 808, types 810, attributes 812, and members 814. Namespaces 808 serve as a means of partitioning types within a .Net Assembly by preserving unique names and may be preserved or shortened to SWF namespace data elements 858 in a mapping step 838. Common Intermediate Language types 810 include classes 816, enumerations 818, interfaces 820 and delegates 822. Common Intermediate Language classes 816 comprise a namespace 808, a name and zero or more members 814. Classes 816 can map to SWF object and/or function data elements 858 in a mapping step 840. Enumerations 818 associate names with integer values and may be mapped to SWF integer or object data elements 858 in a mapping step 842. Interfaces 820 define properties and methods to be implemented by classes 816. Interfaces 820 can match overloaded names on classes 816 that implement given interfaces 820 in a matching step 843. Delegates 822 define signatures for callback functions. In mapping step 844, delegates 822 map to SWF code that simulates Common Intermediate Language delegates 822 using various combinations of SWF actions, tags, and/or records.

Members 814 comprise fields 824, constants 826, events 828, properties 830, indexers 832, methods 834 and constructors 836. Fields 824 have names, hold values and can be mapped to SWF object property data elements 858 in a mapping step 848. Constants 826 represent immutable values such as the number Pi or a string constant. Constants 826 may be inserted as inline data elements 858 into SWF byte code or mapped to SWF object property data elements 858 during a mapping step 850. Events 828 are capable of firing one or more delegates 822 when a state change occurs within a class and may be mapped to SWF event methods during a mapping step 852. Programmer-defined events can be mapped to one or more additional SWF Methods to simulate added event behavior. Properties 830 are a special type of Common Intermediate Language methods 834 that allow a developer to read and set states associated with a Common Intermediate Language object. Indexers 832 are a special type of property 830 in which parameters may be passed. Properties 830 and indexers 832 may be mapped to SWF object methods and SWF action data elements 858 during a mapping step 854.

Methods 834 have a name and zero or more parameters and contain instructions in the form of CIL opcodes. Constructors 836 are a special type of method 834 that are called when a new object is instantiated. Methods 834 and constructors 836 are mapped to SWF action data elements 858 in a mapping step 856.

Figure 9A:
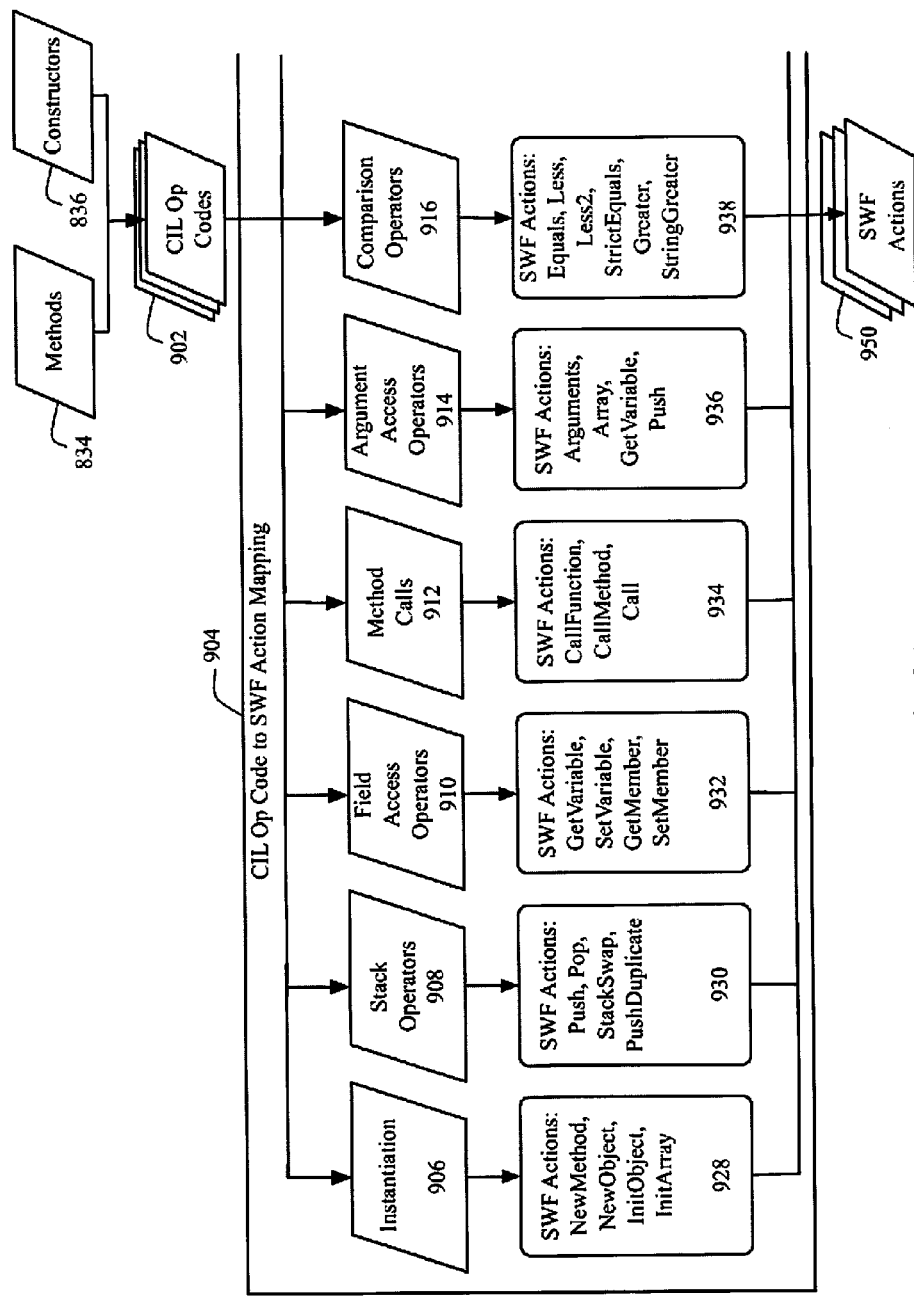
FIGS. 9a and 9b together illustrate an operational flow diagram of one embodiment in accordance with the present invention where a data element mapping step is illustrated in further detail with the mapping of Common Intermediate Language Method and Constructor data elements to SWF Action data elements.
Figure 9B:
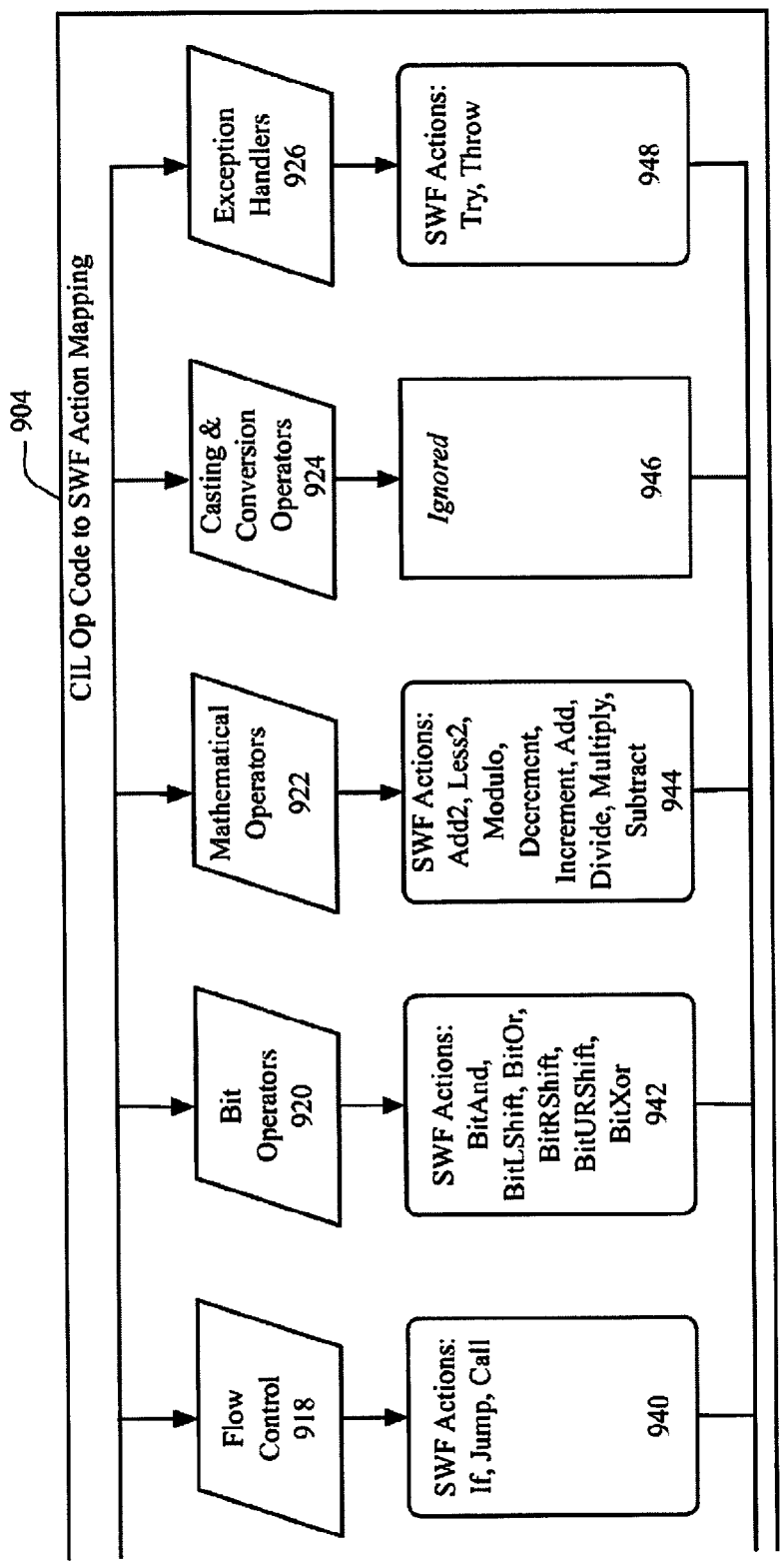

Mapping step 856 is explored in further detail in FIGS. 9a and 9b. FIGS. 9a and 9b, together, illustrate an operational flow diagram in accordance with one embodiment of the present invention illustrating the mapping of Common Intermediate Language methods 834 and constructors 836 to SWF action data elements 950. As explained previously, Common Intermediate Language methods 834 and constructors 836 include one or more Common Intermediate Language opcodes 902. Common Intermediate Language opcodes 902 are separated into different types and mapped to SWF actions in a mapping step 904. Note also that in alternative embodiments according to the present invention, Common Intermediate Language opcodes 902 may additionally or alternatively map to one or more SWF tags or records.

Categories of Common Intermediate Language opcodes include instantiations 906, stack operators 908, field access operators 910, method calls 912, argument access operators 914, comparison operators 916, flow control 918, bit operators 920, mathematical operators 922, casting and conversion operators 924, and exception handlers 926. Instantiation opcodes 906 create new instances of a class and map to SWF action data elements 950 New Method, NewObject, InitObject and InitArray in a mapping step 928. Stack operator opcodes 908 manipulate the stack machine in the Common Language Infrastructure Virtual Execution System and map to SWF action data elements 950 Push, Pop, StackSwap and PushDuplicate in a mapping step 930. Field Access Operators 910 control field values and map to SWF action data elements 950 Get Variable, SetVariable, GetMember and SetMember in a mapping step 932. Method calls 912 map to SWF action data elements 950 CallFunction, CallMethod and Call in a mapping step 934. Argument access operators 914 provide access to the passed arguments in a method 834 and map to SWF action data elements 950 Arguments, Array, GetVariable and Push in a mapping step 936. Comparison operators 916 map to SWF action data elements 950 Equals, Less, Less2, StrictEquals, Greater and StringGreater in a mapping step 938. Flow control opcodes 918 control the flow of execution of byte code and map to SWF action data elements 950 If, Jump and Call in a mapping step 940. Bit operators 920 can manipulate individual bits and map to SWF action data elements 950 BitAnd, BitLShift, BitOr, BitRShift, BitURShift and BitXOR in a mapping step 942. Mathematical operators 922 perform operations on numbers and map to SWF data elements 950 Add2, Less2, Modulo, Decrement, Increment, Add, Divide, Multiply and Subtract in a mapping step 944. Casting and conversion operators 924 are not mapped in an ignoring step 946 because the SWF Engine is type free. Exception handling opcodes 926 map to SWF action data elements 950 Try and Throw in a mapping step 948.

Figure 10:
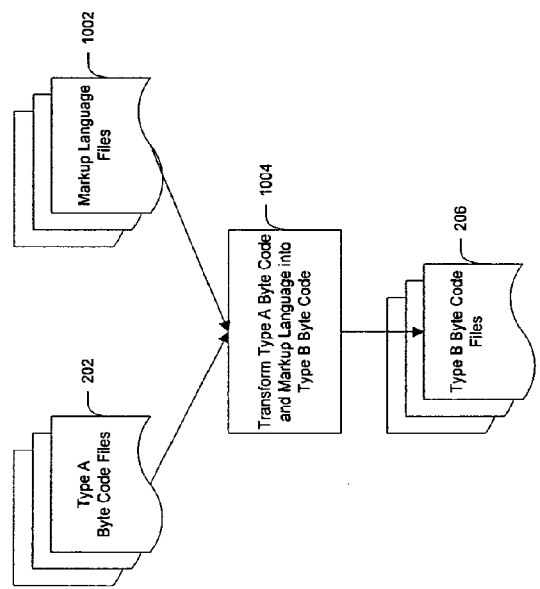
FIG. 10 is an operational flow diagram illustrating a method of converting byte code of a first type and markup language into byte code of a second type according to one embodiment of the invention.

FIG. 10 is an operational flow diagram illustrating a method of converting byte code of a first type and markup language files into byte code of a second type, according to one embodiment of the present invention. Referring to FIG. 10, a first set of byte code files 202 and markup language files 1002 can be converted in a transformation step 1004 into byte codes of a different type 206. Markup language files 1002 can refer to objects, data elements and other information in the first byte code files 202. Markup language files 1002 may also associate and refer to other external resources including text files, digital media files, other markup language files and additional types of byte code files. Markup language files 1002 may further include tags or references for graphically creating a user interface by defining such elements as layout, positioning and vector graphics manipulation. In an embodiment in accordance with the present invention, markup language files 1002 can define the graphical layout of a software application and instantiate objects and data elements from the first set of byte code files 202 to provide the software application with functionality. For example, a XAML markup language file 1002 could define a graphical user interface and associate objects in a Common Intermediate Language byte code file 202 as well as other elements in a .Net Assembly with the user interface. Alternative markup languages capable of mapping to a second byte code 206 include, for example, XML or XUL. XAML is an XML-based language defined by Microsoft Corporation to describe, for instance, user interfaces, vector graphics, animation and data binding. Common Language Infrastructure object data structures following guidelines for serialization can be represented using XAML markup. Both the XAML markup language files 1002 and a .Net Assembly containing Common Intermediate Language byte code 202 can be transformed in a transforming step 1004 into a SWF byte code file 206, wherein at least a portion of the objects, data and structure of the .Net Assembly, as well as XAML instantiation and layout tags, are converted to SWF data elements.

In one embodiment of the invention, one or more markup language files are represented in ASCII text files. The text markup language files are converted into a binary markup language format. A binary markup language format often has a smaller file size because it does not require the overhead of textual semantics to designate structure, and can be utilized more efficiently than text markup language because text markup language files can require more extensive parsing to use. For example, as an intermediate step in a byte code conversion process, a XAML text markup language file can be converted into a BAML binary markup language representation of the XAML file. The BAML file and a first byte code can then be converted into a second byte code as described for FIG. 10 and further described below.

In another embodiment according to the present invention, first byte code files 202 and markup language files 1002 can be converted in the same or related processing step 1004 by a byte code converter application to produce a second byte code 206. In an alternate embodiment, conversion of byte code files 202 and markup language files 1002 may take place at different times and/or as part of different computer processes. For example, a computer user could request a first byte code file 202 through a proxy application. The request could initiate the byte code conversion process and create a second byte code 206. The second byte code 206 could then begin execution on a byte code interpreter as described previously. The second byte code 206 could contain instructions or references to markup language files 1002. The proxy application could dynamically load the markup language files 1002 and initiate further conversion of the markup language code 1002 into additional second byte code 206 that could be loaded into the already running second byte code 206 for further execution. An exemplary scenario can include a user request for Common Intermediate Language byte code 202 from an application that can only execute SWF byte code 206. Upon request, a proxy application can receive Common Intermediate Language byte code 202 and convert it in a transformation step 1004 into SWF byte code 206. Execution of the SWF byte code 206 could then reference or call a XAML markup language file 1002. The proxy application can then receive the XAML markup language code 1002 and convert the markup into additional SWF byte code 206 that is dynamically loaded into the already executing SWF byte code 206. Thus, alternate embodiments of the present invention allow for dynamic byte code conversion of all or portions of a first byte code 202 and markup language code 1002.

Figure 23:
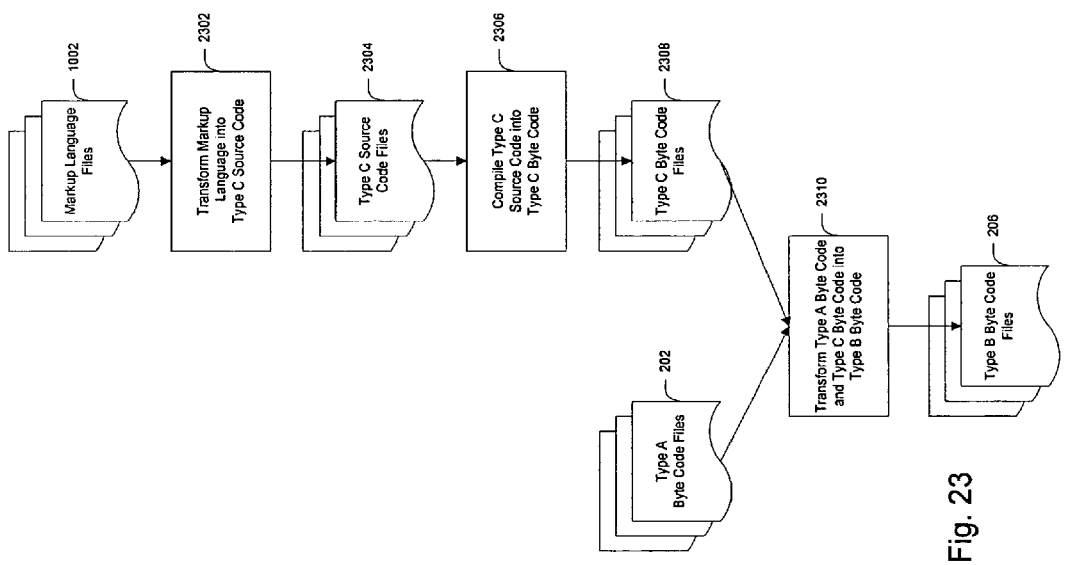
FIG. 23 is an operational flow diagram illustrating a method of taking byte code of a first type, converting markup language into byte code of a third type, and converting the first and third types of byte codes into byte code of a second type.

FIG. 23 is an operational flow diagram illustrating an alternative method of converting byte code of a first type and markup language into byte code of a second type. Referring to FIG. 23, markup language files 1002 are transformed into source code files 2304 in a transformation step 2302. At least a portion of the objects, data elements, display items and other information within a markup language file 1002 are converted into an analogous representation in source code 2304. For example, at least a portion of a XAML markup language file 1002 can be converted into one or more source code language files 2304 in the C#, J#, JScript, Visual C++.Net or Visual Basic .Net languages. In an alternate example, at least a portion of a XUL markup language file 1002 can be converted into one or more source code language files 2304 in JAVA or JavaScript. Moreover, references to the first byte code files 202 and external resource references contained in the markup language files, such as those described below for FIG. 11, can be similarly converted to analogous references in source code 2304. For example, if a XAML markup language file 1002 contained display and layout instructions for a button object defined in a source CIL byte code file 202, the instructions can be transformed into display and layout C# programming language instructions for the button in a C# source code file 2304. In step 2306, source code files 2304 are compiled to form additional byte code files 2308. Source code files 2304 can be compiled into byte code files 2308 as described previously. For example, C# source code 2304 could be compiled by a byte code compiler into CIL byte code 2308. The resulting converted byte code 2308 can be of the same type or of a different type from the source first byte code 202. In step 2310, both the source byte code files 202 and converted byte code files 2308 are transformed into byte code files of a second type 206. The source byte code files 202 and converted byte code files 2308 can be transformed into a byte code of a different type using the process and methods described previously for transforming a single type of byte code into a target byte code of a different type. In the case that the source code files 2304 contain references to the source byte code 202 or external resources, those references are compiled with the rest of the source code 2304 and preserved in the resulting byte code 2308. The source byte code files 202 and converted byte code files 2308 may be of similar and/or different types from each other and the resulting byte code 206. For example, source CIL byte code 202 and converted JAVA byte code 2308 could be transformed into target SWF byte code 206. Alternately, source CIL byte code 202 and converted SWF byte code 2308 could be transformed into target SWF byte code 206.

Figure 11:
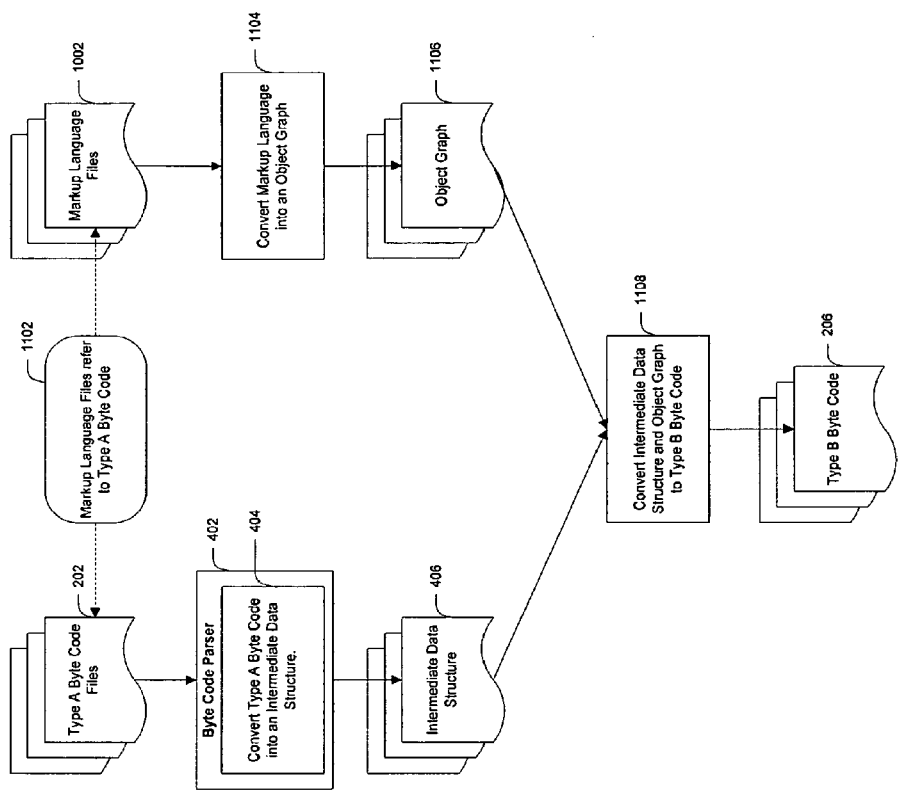
FIG. 11 is an operational flow diagram illustrating a method of converting byte code of a first type into an intermediate data structure and markup language into an object graph, and converting both into byte code of a second type according to one embodiment of the invention.

FIG. 11 is an operational flow diagram illustrating one method in accordance with the present invention of converting byte code of a first type 202 into an intermediate data structure 406 and markup language files 1002 into an object graph 1106, and converting both into byte code of a second type 206. Byte code files of a first type 202 can be received by a byte code parser 402 and converted in a converting step 404 into one or more intermediate data structures 406, as previously described.

Alternately, or in addition, markup language files 1002 can be received and converted to an object graph 1106 in a converting step 1104. An object graph 1106 is typically a directed graph or tree data structure consisting of objects linked to other related or associated objects. Object graphs 1106 may be encapsulated in markup language files, custom text-based languages, or in other binary formats. In context of an embodiment in accordance with the present invention, an object graph 1106 can represent some or all markup language tags and constructs as objects within the graph structure. Further, an object graph 1106 can reference 1102 a first byte code 202 and serve as a serialization format that preserves typing for data elements of a first byte code 202, type values, and the relationship of types to other types. As an example, a XAML markup language file 1002 containing references to data elements in a .Net Assembly comprising Common Intermediate Language byte code 202 could be parsed to generate a Common Language Infrastructure object tree 1106 where at least a portion of the object tree objects correspond to Common Language Infrastructure classes in the Common Intermediate Language byte code 202, and at least a portion of the object tree object properties correspond to class properties. The Common Language Infrastructure object tree 1106 and Common Intermediate Language byte code 202 or .Net XML DOM intermediate data structure 406 could then be converted in a converting step 1108 into byte code of a different type 206 like, for example, SWF byte code 206. In yet another embodiment according to the present invention, first byte code 202 and an object graph of a first type 1106 can be converted into a second byte code 206 as well as an object graph of a second type. Similar to the object graph 1106 illustrated in FIG. 11, an object graph of a second type can reference data elements, objects and other information in a second byte code 206, as well as define an object hierarchy and object relationships.

Figure 12:
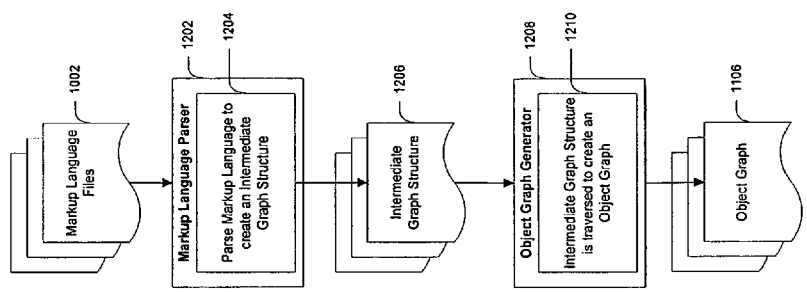
FIG. 12 is an operational flow diagram illustrating a method of converting markup language into an object graph according to one embodiment of the invention.

One method of generating an object graph 1106 is illustrated in further detail in FIG. 12. FIG. 12 is an operational flow diagram illustrating a method in accordance with one embodiment of the invention of parsing markup language files 1002 into an intermediate graph structure 1206, which is then traversed to produce an object graph 1106. In a parsing step 1204, a markup language parser 1202 receives markup language files 1002, parses the markup language tag structure and creates an intermediate graph structure 1206. The intermediate graph structure 1206 reflects the original structure of the markup language document and is typically a tree structure. The intermediate graph structure 1206 provides the underlying framework for creating an object graph 1106. In a generating step 1210, an object graph generator 1208 traverses the intermediate graph structure 1206 and creates an object graph 1106. During the generating step 1210, any markup language code 1002 references to data elements in byte code of a first type may be associated with objects and properties in the resulting object graph 1106. For example, an XML markup language source file 1002 could be parsed into an intermediate tree format 1206 representing the hierarchical structure of tags in the XML document. The intermediate tree format 1206 could then be traversed to generate objects and properties for an object graph 1106 and to associate each XML tag in the hierarchy byte code data elements where the XML markup language source file 1002 contained external byte code references.

Figure 13:
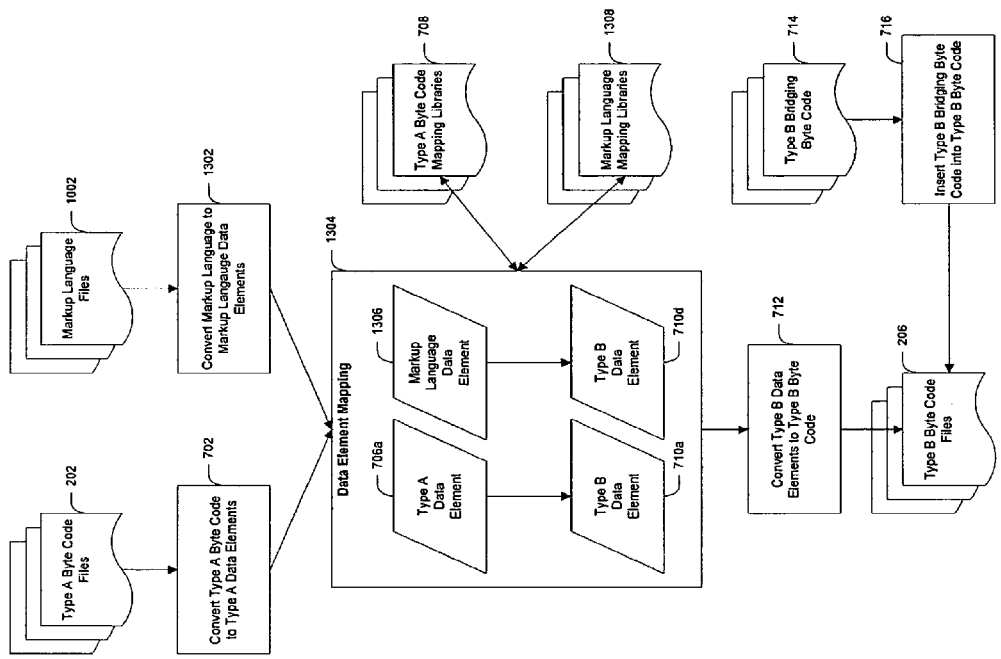
FIG. 13 is an operational flow diagram illustrating a method of converting byte code of a first type and markup language code into byte code of a second type by mapping data elements from byte code of a first type and markup language code to data elements from byte code of a second type according to one embodiment of the invention.

A method of converting byte code of a first type 202 and markup language code 1002 into byte code of a second type 206 is examined in greater detail in FIG. 13. FIG. 13 is an operational flow diagram illustrating a method in accordance with an embodiment of the present invention of mapping data elements 706 from a first byte code 202 and data elements 1306 from markup language code 1002 to data elements 710a,d of a second byte code 206. In converting step 702, byte code files of a first type 202 can be converted into one or more byte code data elements 706. Similarly, in a converting step 1302, markup language files 1002 can be converted into one or more markup language data elements 1306. As described above, data elements 706, 1306 can include objects, instructions, and numerous other structural elements within a computer program. Turning to markup language data elements 1306 specifically, markup language data elements 1306 most typically include information relating to the appearance and displayed structure of a computer program as well as references to data and functionality in a first byte code 202. For example, markup language data elements 1306 could include data structures defining colors, lines, shapes, text and layout positions in markup language code 1002, as well as many other data structures as would be apparent to one of ordinary skill in the art and as will be described in further detail below. In an exemplary embodiment, a XAML markup language file 1002 could be parsed into a group of data elements 1306 including external file references, colors, brushes, pens, shapes, text, images, animations, transforms, sound, video and controls. It should also be noted that because many markup languages are extensible, the list of constituent data elements 1306 comprising a markup language file 1002 is not bounded and extensible as well.

In a mapping step 1304, data elements of a first byte code 706 and data elements of markup language 1306 are parsed from byte code 202 and markup language files 1002, respectively. At least a portion of the data elements 706, 1306 can be mapped to data elements of a second type 710a,d. Information contained in the source byte code 202 may also be used to assist the mapping process 1304 for markup language data elements 1306 and vice versa. Alternatively, markup language data elements 1306 may be mapped to data elements of a second type 710d without reference to the first byte code 202 or byte code data elements 706 and vice versa. In a converting step 712, data elements of a second type 710a,d can be received and assembled into a resulting byte code of a second type 206.

In one embodiment in accordance with the present invention, the mapping step 1304 is carried out by referencing markup language mapping libraries 1308. Markup language mapping libraries 1308 can contain instructions or subroutines that receive input from markup language data elements 1306, determine if any mapping exists to one or more data elements of a second type 710d, and return information indicating which, if any, data elements of a second type 710d have matches. Markup language mapping libraries 1308 can comprise mapping instructions for mapping display and layout elements defined in the markup language code 1002, as well as mapping and association instructions for references to first byte code data elements 706 in the markup language code 1002. Markup language mapping libraries 1308 can be implemented in any similar digital format as byte code mapping libraries 708, as previously described. In an embodiment in accordance with the present invention, a markup language mapping library 1308 could contain instructions for mapping XAML tag data elements 1306 to SWF data elements 710d, as explained in further detail below.

In another embodiment in accordance with the present invention, the mapping step 1304 is augmented by referencing byte code mapping libraries 708. Byte code mapping libraries 708, as previously described, can contain instructions or code for mapping first byte code data elements 706 to one or more second byte code data elements 710a.

In another embodiment in accordance with the present invention the mapping step 1304 is carried out by referencing both byte code mapping libraries 708 and markup language mapping libraries 1308, as individually explained above. Moreover, information in one mapping library 708, 1308 may be used to help data element matching for either or both forms of data elements 706, 1306. The mapping libraries 708, 1308 may be stored and executed as part of the same library file or packaged set of libraries. In the alternative, the mapping libraries 708, 1308 may comprise physically separate digital files. In addition, either or both of the mapping libraries 708, 1308 may be implemented in preferred embodiments in accordance with the present invention as lookup tables, as previously described in greater detail. Alternatively, the mapping libraries 708, 1308 could comprise data structures such as hash tables, associative arrays or arrays.

Additional embodiments in accordance with the present invention illustrated in FIG. 13 can carry out an insertion step 716 to insert bridging byte code of a second type 714 in the resulting second byte code 206. During the data element mapping step 1304, it is possible that either first byte code data elements 706 and/or markup language data elements 1306 will not be successfully mapped to second byte code data elements 710a,d. As described above, in such cases where not all data elements 706, 1306 are mapped, the resulting byte code 206 may lack portions of functionality or data in source byte code 202 or markup language code 1002.

One method to redress this situation, according to an embodiment in accordance with the present invention, is to insert bridging byte code 714 in an insertion step 716. The bridging byte code 714 may comprise, for example, additional functional or data code in the case that one or more first byte code data elements 706 failed to map. Alternately, or in addition, the bridging byte code 714 may comprise, for example, layout instructions or display elements in the case that some of the markup language data elements 1306 were not mapped.

In one embodiment according to the present invention, bridging byte code 714 is generated automatically by a computer process in response to mapping step 1304 and/or conversion step 712, as described in detail above. The bridging byte code 714 may be generated by a software application that is part of the one or more software applications executing the overall byte code conversion process, or the bridging byte code 714 may alternately be generated by a standalone software application that is called as necessary. The generated bridging byte code 714 is then inserted into the resulting byte code 206.

In yet another embodiment according to the present invention, a programmer or external software application can initiate the insertion step 716 and insert custom bridging byte code 714. As described previously, a developer may examine the second byte code 716 and discover functionality or data missing that was originally contained in the first byte code 202 and/or markup language code 1002. The developer may then create custom bridging byte code 714 and insert the code into the second byte code 206 in an insertion step 716. Alternately, a computer program may be executed which performs the tasks of analyzing missing functionality, generation of bridging byte code 714 and insertion in an insertion step 716.

Figure 14A:
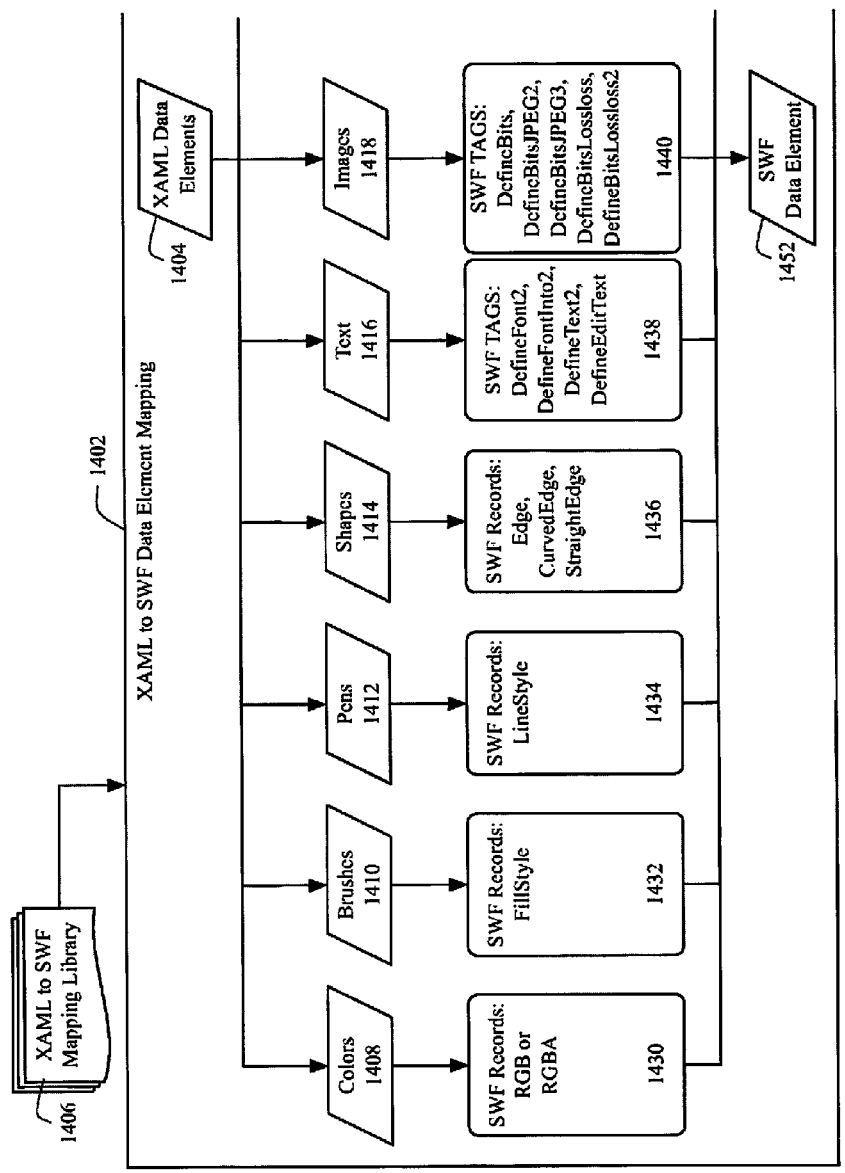
FIGS. 14a and 14b together illustrate an operational flow diagram of a mapping step in accordance with the present invention in which XAML markup language data elements are mapped to data elements of SWF byte code.
Figure 14B:
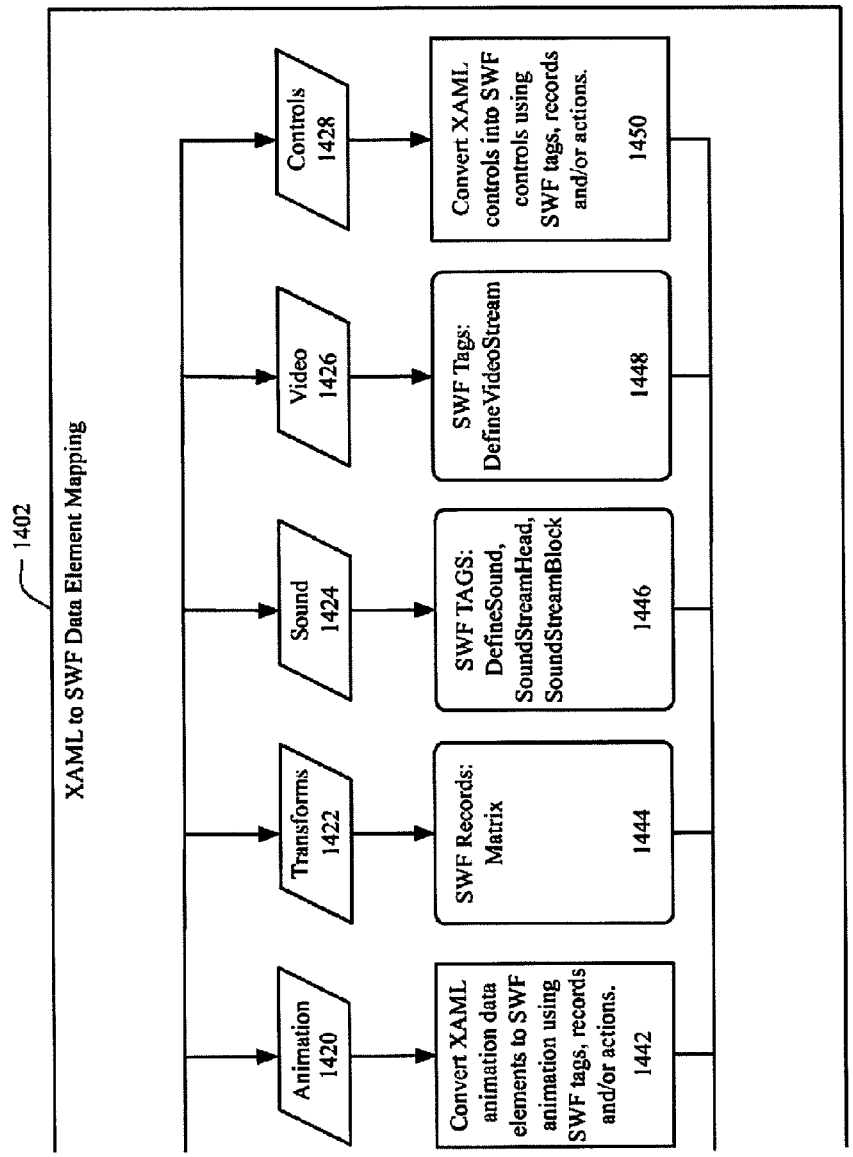

FIGS. 14a and 14b, together, show in greater detail one preferred embodiment for a mapping step 1402. FIGS. 14a and 14b together illustrate an operational flow diagram of a data element mapping step 1402 according to an exemplary embodiment in accordance with the present invention in which XAML markup language data elements 1404 are mapped to SWF data elements 1452. As previously noted, XAML is an implementation of XML and thus, any specific discussion of XAML in the present preferred embodiment necessarily applies to XML, as well as serving as a general example of the capabilities of markup languages in the present invention. A mapping step 1402 can optionally reference mapping instructions contained in a markup language mapping library 1406. Alternately, a mapping step 1402 can be performed with instructions in the native software application that performs the mapping step 1402.

XAML data elements 1404 can be further categorized into various XAML data element types 1408-1428. It is important to note that because XAML, XML and other "extensible" markup languages are extensible, the set of different constituent tags, categories, types and data elements 1404 is potentially limitless. Thus, the categories noted in this exemplary embodiment are provided for illustrative purposes and are not intended to limit the scope of the present invention. XAML data elements 1404 can comprise constructs such as colors 1408, brushes 1410, pens 1412, shapes 1414, text 1416, images 1418, animation 1420, transforms 1422, sound 1424, video 1426 and controls 1428. XAML colors 1408 are represented as four bytes, one for each color channel (red, green and blue) and one for the alpha channel. In mapping steps 1430-1450, XAML constructs 1408-1428 are mapped where possible to analogous SWF constructs comprised of one or more SWF tags, records and/or actions. It should also be noted that although specific SWF tags, records and/or actions are specified for mapping XAML data elements 1404, XAML data element types 1408-1428 can be mapped in respective mapping steps 1430-1450 in varying combinations of SWF tags, records and/or actions. Where no direct analogous elements between XAML and SWF exist, embodiments in accordance with the present invention may simulate XAML elements by substituting combinations of two or more SWF tags, records and/or actions that together approximate a given XAML element.

XAML colors 1408 can be mapped to SWF RGB or RGBA records in a mapping step 1430. Brushes 1410 are used to fill regions of a vector graphic shape and typically comprise solid, gradient or bitmap type brushes. Brushes 1410 are translated to SWF FillStyle records in a mapping step 1432. Pens 1412 are used to draw the contours of shapes and comprise properties such as brush, thickness, starting line cap, ending line cap, dash array, dash cap and line join. Pens 1412 can be translated to SWF LineStyle records in a mapping step 1434. XAML shapes 1414 include, for example, ellipses, lines, paths, polygons, polylines, rectangles and rounded rectangles and are translated to SWF Edge records in a mapping step 1436. Specifically, ellipses are converted to SWF CurvedEdge records. Lines, polygons, polylines and rectangles are converted SWF StraightEdge records. Paths and rounded rectangles are converted into series of SWF CurvedEdge and StraightEdge records. Text 1416 comprises a series of Unicode characters and is translated to SWF DefineFont2, DefineFontInfo2, DefineText2 or DefineEditText SWF tags in a mapping step 1438. Images 1418 consist of a grid of pixel data that can be compressed or represented in a variety of formats including: BMP, EMG, EXIF, GIF, JPEG, PNG, TIFF, WMF and SWF. JPEG images are converted to SWF DefineBits, DefineBitsJPEG2 and DefineBitsJPEG3 tags in a mapping step 1440. The other exemplary formats mentioned above are converted to SWF DefineBitsLossless and DefineBitsLossless2 tags in a mapping step 1440. XAML defines animation 1420 as values that change over time and will animate values including: Boolean, Byte, Int16, Int32, Int64, Single, Double, Color, Length, Size, Thickness, Point, Rect, Vector, Matrix and Path. SWF defines animation using frames and change values for each frame. The step 1442 of converting XAML animation 1420 to SWF animation comprises matching time-based animation values to the target frame rate of the resulting SWF file. XAML transforms 1422 are used to place and modify objects, fills, text and buttons. XAML presently supports many transformation types including: rotate, scale, skew and translate, as well as concatenations of transforms using matrix multiplication. XAML transforms 1422 are converted to SWF Matrix records in a mapping step 1444. SWF Matrix records may then be associated with tags and records for other SWF data elements 1452 to perform transformations on those data elements 1452. XAML sound elements 1424 link to embedded or streaming sound files comprising series of samples at a given sample rate. In a mapping step 1446, XAML embedded sound references 1424 are converted to SWF DefineSound tags, and XAML streaming sound references 1424 are converted to SWF SoundStreamHead and SoundStreamBlock tags. XAML video references 1426 link to video files comprising series of raster image frames. Video files are typically streamed from an external source. XAML streamed video references 1426 are converted to SWF DefineVideoStream tags in a mapping step 1448.

XAML controls 1428 may comprise any of the XAML elements described in FIG. 14 or other XAML elements. Examples of controls include: Button, Canvas, CheckBox, ComboBox, Group, Image, Label, ListBox, Menu, Panel, RadioButton, ScollBar, TabControl, TextBox, Timer, and Window. In addition, custom controls may be created, leading to an unbounded list of potentially applicable controls 1428. Controls may contain both display elements and functionality, typically by referring to external byte code such as Common Intermediate Language byte code in a .Net Assembly. In a conversion step 1450, controls 1428 can be converted into SWF data elements 1452 using the previously described techniques for mapping XAML to SWF data elements and mapping .Net Assemblies and Common Intermediate Language data elements to SWF data elements.

With reference to FIGS. 11, 12 and 13, an object graph 1106 may be utilized in embodiments in accordance with the present invention in the step 1302 of converting markup language files 1002 into data elements 1306. Referring to FIG. 11, and as described above, markup language files 1002 may be converted into an object graph 1106 in a converting step 1104. The resulting object graph 1106 comprises a graph structure of markup language tags and/or first byte code 202 associations. With reference to FIG. 12, and as previously detailed, in one embodiment in accordance with the present invention, an object graph 1106 is optionally generated by first converting markup language code 1002 into an intermediate graph structure 1206. Referring now to FIGS. 11 and 13, during a conversion step 1302 some or all of the individual objects in the object graph 1106 may be converted to markup language data elements 1306. Because an object graph 1106 comprises an ordered structure of markup language objects, it is more readily parsed into individual data elements.

Referring now to FIG. 11, when an intermediate data structure 406 is generated from first byte code 202 and used in conjunction with an object graph 1106, the structure and contents of an overall software program become much more apparent and distinguishable. Thus, with reference to FIGS. 11 and 13, a preferred embodiment in accordance with the present invention converts first byte code intermediate data structures 406 into first byte code data elements 706, and converts markup language object graphs 1106 into markup language data elements 1306. In this preferred embodiment, at least a portion of both the byte code 202 and markup language code 1002 is already in a structured and ordered format prior to respective data element conversions 702, 1302.

Figure 16:
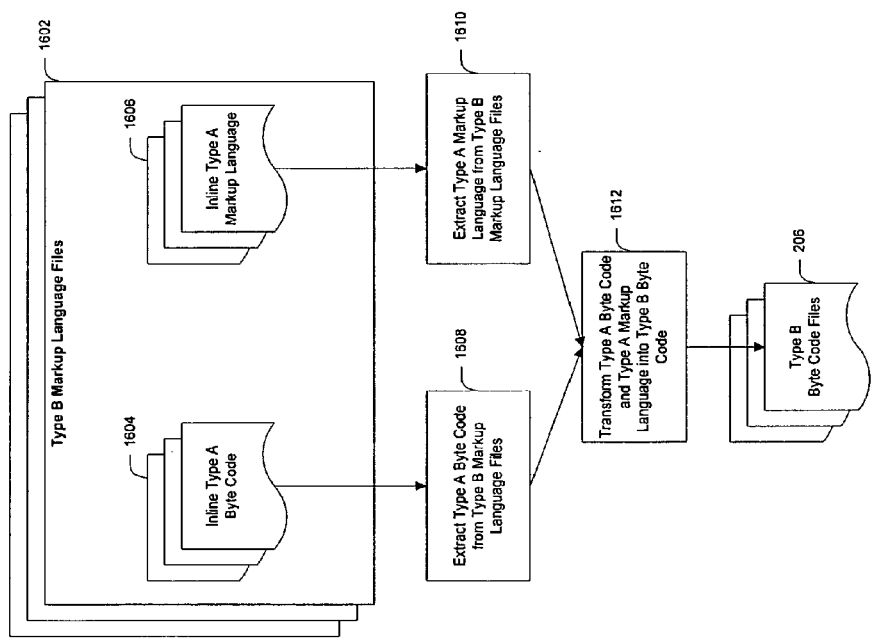
FIG. 16 is an operational flow diagram illustrating a method of converting inline byte code of a first type and inline markup language into byte code of a second type according to one embodiment of the invention.

FIG. 16 is an operational flow diagram illustrating one method in accordance with the present invention of extracting inline byte code of a first type 1604 and inline markup language code of a first type 1606 from a second markup language wrapping file 1602 and converting both to byte code of a second type 206. As described above, markup languages can describe many types of data including text, graphics, user interfaces and references to byte code data. In addition, markup languages can store byte code 1604 and/or other markup language code 1606 as inline data within a wrapping markup language file 1602. In one embodiment, inline data can be designated by "markers" that indicate the beginning and end of various sections of inline markup code 1606 and/or inline byte code 1604. Inline byte code 1604 is extracted in an extracting step 1608 to form stand-alone or separate byte code of a first type. Inline byte code 1604 may be in either binary format or in an intermediate language format, as previously described. Inline markup language code 1606 is extracted in an extracting step 1610 from the wrapping markup language file 1602 to form stand-alone or separate markup language code. Exemplary wrapping markup language formats include any scripting markup language, such as ASP, PHP or CFML, as well as extensible markup languages, such as XML and XAML. Exemplary inline markup language formats include any markup language format discussed herein. The extracted byte code of a first type and markup language code are then converted to byte code of a second type 206 in a transformation step 1612. In one embodiment according to the present invention, a request for a wrapping markup language file 1602 initiates the extraction and conversion processes 1608, 1610 and 1612. For example, a web browser request to an ASP scripting markup language file 1602 containing inline XAML markup language 1606 and byte code 1604 could initiate the extraction steps 1608 and 1610, as well as the conversion step 1612 to form SWF byte code 206 for display within the ASP markup page 1602 using a Flash plug-in executing within a web browser. Moreover, the extracted byte code of a first type and markup language code can be transformed according to any of the embodiments of the present invention disclosed herein, as well as variations that will become apparent to those of skill in the art upon reading the description herein.

Figure 17:
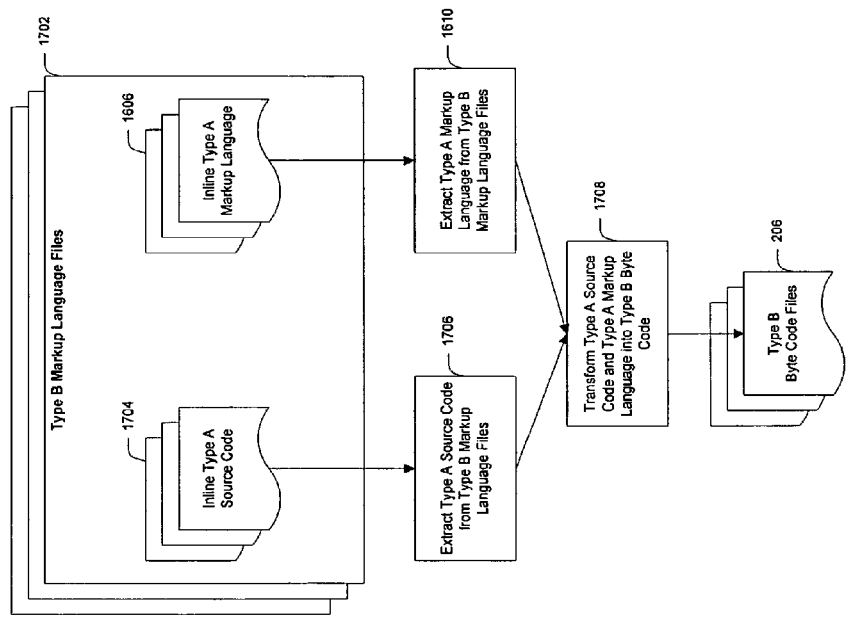
FIG. 17 is an operational flow diagram illustrating a method of converting inline source code and inline markup language into byte code according to one embodiment of the invention.

FIG. 17 is an operational flow diagram illustrating one method in accordance with the present invention of extracting source code 1704 and inline markup language code of a first type 1606 from a second markup language wrapping file 1702 and converting both to byte code 206. Markup languages can further store program source code 1704 as inline data in a wrapping markup language file 1702. Inline source code 1704 is extracted in an extracting step 1706 and mapped to a byte code 206 in a transformation step 1708. Exemplary inline source code languages include Java, ActionScript, or any Common Language Infrastructure language. Similar to FIG. 16, inline markup language code 1606 is extracted in step 1610 and mapped to byte code 206 in step 1708.

Figure 19:
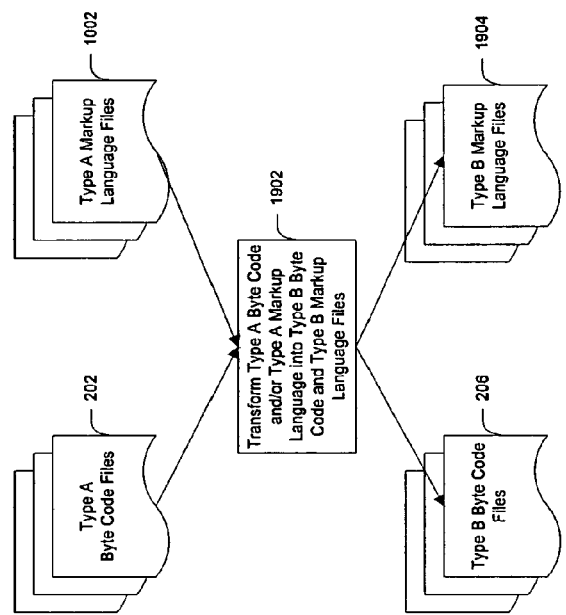
FIG. 19 is an operational flow diagram illustrating a method of converting byte code of a first type and/or markup language of a first type into byte code of a second type and markup language of a second type according to one embodiment of the invention.

In addition to embodiments converting byte code and markup language code into byte code of a second type, further embodiments in accordance with the present invention can produce byte code of a second type as well as markup language of a different type. FIG. 19 is an operational flow diagram illustrating a method of converting byte code of a first type 202 and/or markup language code of a first type 1002 into byte code of a second type 206 and markup language code of a second type 1904 in a transforming step 1902, according to an alternate embodiment of the present invention. It should be noted that markup languages may be of different types while at the same time being sub- or super-sets of one another. For instance, XAML and XML could be considered different types of markup languages, despite the fact that XAML is an XML-based language. As an exemplary scenario, SWF byte code 202 and optionally XML markup language code 1002 could be converted into Common Intermediate Language byte code 206 and XAML markup language code 1904, wherein at least a portion of the objects, data, data descriptions, display instructions and structures of the SWF and optional XML code are converted to either Common Intermediate Language or XAML data elements.

The method illustrated in FIG. 19 can extend and enhance many of the various methods, intermediate procedures and embodiments according to the present invention previously described. With reference to FIG. 4, FIG. 4 illustrates a method of converting a first byte code 202 into an intermediate data structure 406. Similarly, an embodiment in accordance with the method illustrated in FIG. 19 may create an intermediate data structure corresponding to a second byte code type, which is used to then create a second byte code 206. Turning to FIG. 5, FIG. 5 illustrates a method of converting byte code 202 into an intermediate language format 506. Similarly, in an embodiment in accordance with the illustration in FIG. 19, an intermediate data structure of a second type may be further converted into an intermediate language format of a second byte code type. The intermediate language format of a second byte code type may be compiled into second byte code 206. With reference to FIG. 7, FIG. 7 discloses a method of mapping data elements of a first byte code type 706*a-c* to data elements of a second byte code type 710*a-c*. Similarly, another embodiment in accordance with the method illustrated in FIG. 19 can map data elements of a first byte code type to both data elements of a second byte code type and/or data elements of a second markup language type. With reference now to FIG. 19 in view of FIG. 13, data elements of a first markup language type can also be mapped to both data elements of a second byte code type and/or data elements of a second markup language type. The second byte code and second markup language data elements can be assembled into second byte code files and second markup language files, respectively. Additionally, bridging byte code of a second type or bridging markup language of a second type can be inserted into the resulting byte and markup language code as described for bridging byte code insertion above.

With reference to FIG. 12, FIG. 12 illustrates a method of converting a markup language file into an intermediate graph structure 1206. The intermediate graph structure 1206 can be converted into an object graph 1106 for further conversion, as illustrated in FIG. 11. Turning to FIG. 19, an alternate embodiment of the method illustrated in FIG. 19 can create an object graph of a second markup language type that can represent some or all markup language tags from an optional first markup language code, as well as references to data and objects in a destination second byte code. Additionally, a second markup language object graph may be further processed into an intermediate graph structure reflecting the structure of a destination markup language file 1904. The object graph and/or the intermediate data structures may be converted into markup language of a second type 1904. With reference to the method illustrated in FIG. 19 viewed in light of FIG. 13, byte code and markup language mapping libraries can be optionally used to map input data elements to byte code data elements of a second type and markup language data elements of a second type.

With reference now to FIG. 19, as a further exemplary scenario, SWF byte code 202 and optionally XML markup language code 1002 can be mapped to data elements of a Common Intermediate Language byte code type and data elements of a XAML markup language type. The Common Intermediate Language byte code data elements can be converted in step 1902 into a DOM or abstract syntax tree intermediate data structure. The intermediate data structure can be further converted into CIL assembly language (an intermediate language format). The CIL assembly language files can be assembled into a resulting Common Intermediate Language byte code 206. The XAML markup language data elements may be assembled into an intermediate XAML graph structure and further assembled into a XAML object graph. The resulting XAML object graph can then be parsed into a XAML markup language file 1904.

Figure 20:
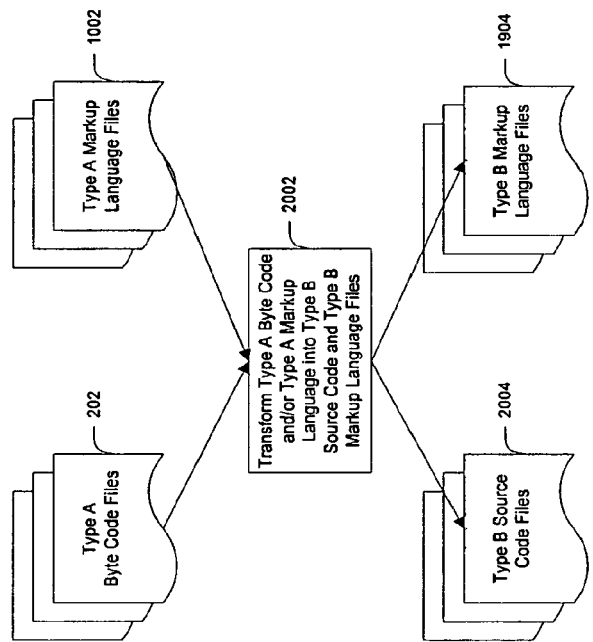
FIG. 20 is an operational flow diagram illustrating a method of converting byte code of a first type and/or markup language of a first type into source code of a second type and markup language of a second type according to one embodiment of the invention.

FIG. 20 is an operational flow diagram illustrating a method of converting byte code of a first type 202 and/or markup language code of a first type 1002 into source code of a second type 2004 and markup language code of a second type 1904 in a transforming step 2002, according to an alternate embodiment of the present invention. The method illustrated in FIG. 20 incorporates the transformations described previously for first byte code files 202, first markup language files 1002 and second markup language files 1904. In an embodiment illustrated in FIG. 20, byte code files 202 and optionally first markup language files 1002 are converted to source code files 2004. Source code files 2004 can be created by mapping data elements of first byte code files 202 and markup language files 1002 to data elements of a target source code, as similarly described above. Alternately, or in addition, first byte code files 202 and first markup language files 1002 can be converted into an intermediate data structure of a destination source code type. The intermediate data structure may then be disassembled directly to source code. For example, SWF byte code 202 and optional XML markup language code 1002 can be converted into XAML destination markup language code 1904 in a similar fashion as that previously described while additionally converting at least a portion of the SWF and/or XML codes into C# source code file 2004. In an alternate example, CIL byte code 202 and optional XAML markup language code 1002 can be converted into HTML or XML destination markup language code 1904 and JavaScript source code 2004. Additionally, the JavaScript source code 2004 could be stored within an HTML or XML destination markup language code file 1904, or in a separate source code file.

Figure 24:
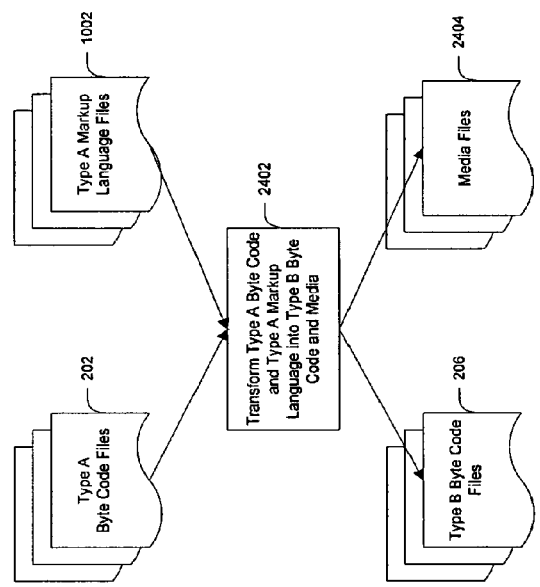
FIG. 24 is an operational flow diagram illustrating a method of converting byte code of a first type and markup language of a first type into byte code of a second type and media files according to one embodiment of the invention.

FIG. 24 is an operational flow diagram illustrating a method of converting byte code of a first type 202 and markup language code 1002 into byte code of a second type 206 and one or more media files 2404. The method illustrated in FIG. 24 also incorporates the transformations described previously for first byte code files 202, first markup languages files 1002 and producing second markup language files. In an embodiment illustrated in FIG. 24, one or more byte code files of a first type 202 and one or more markup language files 1002 are converted in a transforming step 2402 into byte code files of a second type 206 and one or more media files 2404. Media files generally comprise any format in which digital media can be stored or compressed, including images, sounds or video. In a further embodiment according to the invention, display elements from a first markup language 1002 are converted into analogous display elements in a media file 2404. For example, a graphical display object in a XAML markup language file 1002 could be converted into an image bitmap media file 2404, or converted into other image formats such as Portable Network Graphics (PNG), Joint Photographic Experts Group (JPEG), or Graphics Interchange Format (GIF) formats. Alternatively, sound media files 2404 in such formats as Audio Interchange File Format (AIFF), MP3, WAVEform audio format (WAV), Windows Media Audio (WMA), Advanced Audio Coding (AAC), Ogg Vorbis, or RealAudio could be produced. Video media files 2404 in such formats as QuickTime, MPEG, RealVideo, Audio Video Interleave (AVI), or Windows Media Video (WMV) could also be produced. In an alternate embodiment, graphical or media data elements of a first byte code 202 are converted into analogous elements in a media file 2404. Such embodiments are useful for portable display devices, like personal digital assistants, that might not be able to correctly render a second byte code 206 and/or produced second markup language code, but can display media such as basic image formats from a media file 2404.

Figure 15:
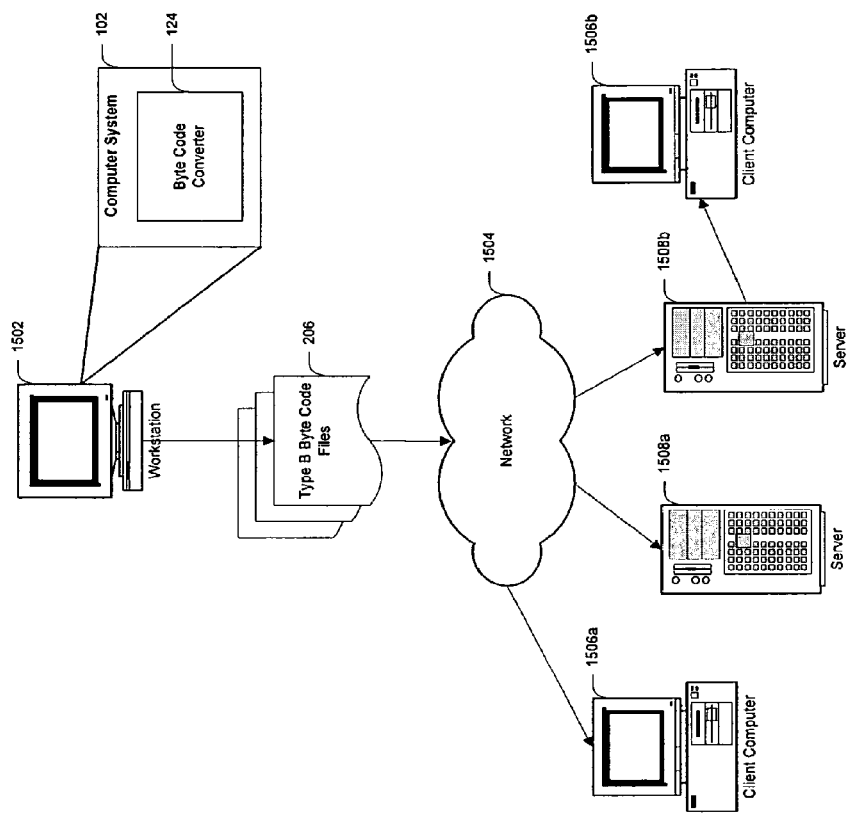
FIG. 15 is a diagram of a computer connected by a computer network to client computers and servers according to one embodiment of the invention.

FIG. 15 describes in greater detail various embodiments according to the present invention for utilizing byte code files 206 created in a computer system 102 by a byte code converter 124. FIG. 15 is a diagram of a workstation computer 1502 connected to client computers 1506a-b and servers 1508a-b across a network 1504. A workstation 1502 comprises an exemplary computer system environment 102 and a byte code converter 124 as previously described. The byte code converter 124 produces byte code of a second type 206 according to the exemplary systems and methods described previously, as well as variations that will become apparent to those of skill in the art after reading this description. The byte code conversion process may be initiated by a user action on a workstation 1502, or it may be automatically initiated by some other process or application running on a workstation 1502 or another computer across a network 1504. Workstation 1502 may alternately be any type of computer system that is capable of producing a second byte code 206 according to the present invention, including, for example, client computers 1506a-b, servers 1508, and laptop computers. Examples of a network 1504 can include LANs, WANs or the interne. In one embodiment according to the present invention, a workstation 1502 may transmit second byte code files 206 across a network 1504 directly to a client computer 1506a in a peer-to-peer network configuration. In an alternate embodiment, a workstation 1502 may transmit second byte code files 206 across a network 1504 to server computers 1508a-b. Servers 1508a-b can make the second byte code files 206 available for transmission to other computers on the network 1504. For example, a server 1508a may serve second byte code files 206 to a client computer 1506b in a server-client network configuration. Examples of applications that may transmit second byte code files 206 across a network 1504 include web server applications, File Transfer Protocol (FTP) applications, peer-to-peer sharing applications, email server applications, and multimedia server applications. As an illustrative example, a Windows server could receive second byte code files 206 and serve the files to web browser clients by posting the files for download through Microsoft Internet Information Server (IIS) (a web server application). It should be further noted that additional network configurations, such as ring topologies, hub, and spoke topologies could also be implemented to receive and distribute second byte code files 206 according to the present invention.

Figure 26:
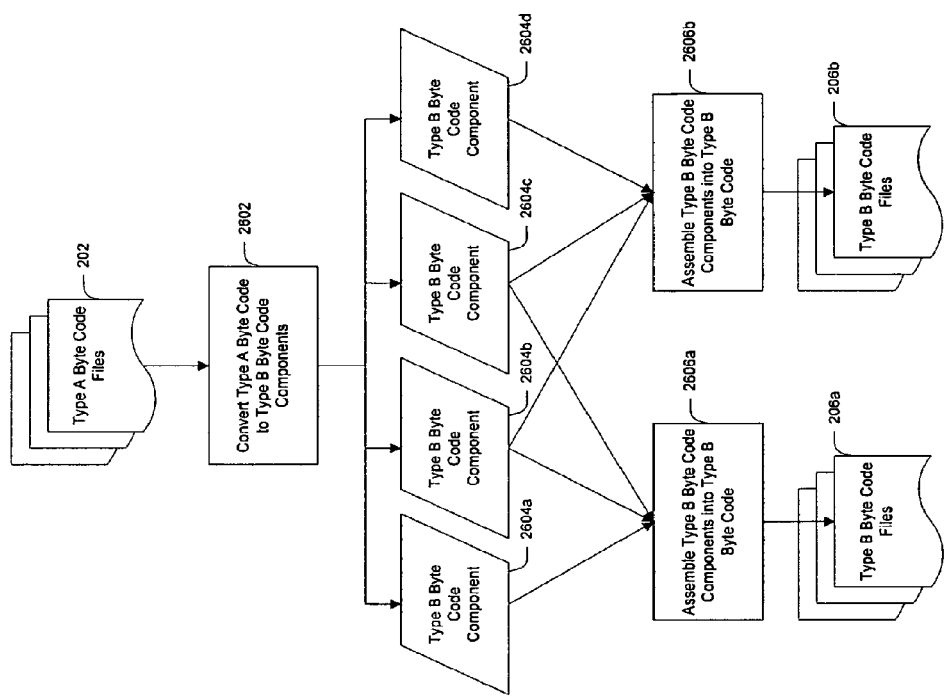
FIG. 26 is an operational flow diagram illustrating a method of converting byte code of a first type into byte code components of a second type and assembling the components into byte code of a second type according to one embodiment of the invention.

FIG. 26 illustrates an embodiment according to the present invention in which byte code of a first type 202 is converted into byte code components of a second type 2604a-d, which can be assembled into byte code files of a second type 206a-b. In a converting step 2602, byte code files 202 are converted into one or more byte code components 2604a-d. A byte code component 2604a-d is any portion of a byte code application that can be combined with another byte code component 2604a-d to form together byte code of a second type 206a-b. A byte code component 2604a-d may comprise a stand-alone application, or only a portion, library, or data store from a larger byte code application. Byte code components 2604a-d may be comprised of one or more data elements of a second type, as described above for FIG. 7. Byte code components 2604a-d can represent different parts of a software application. For example, one byte code component 2604a-d may contain byte code instructions for the underlying functionality and logic for a software application, while another byte code component 2604a-d may contain instructions for a graphical user interface for a specific operating system platform. In one or more assembling steps 2606a-b, at least one byte code component 2604a-d is assembled to form byte code of a second type 206a-b. The assembling step 2606a-b also determines which byte code components 2604a-b should be selected and assembled to form target byte code files 206a-b. Such a determination can be made automatically by a process on the computer performing the byte code conversion, or manually by a computer administrator. In a preferred embodiment, determination and selection of byte code components 2604a-d is performed dynamically and automatically by a computer in response to a request for target byte code 206a-b from another computer or process. The assembled byte code of a second type 206a-b can comprise a single file or alternately many files. In an exemplary scenario, byte component 2604a contains byte code instructions for a graphical user interface for the Windows operating system, component 2604b contains byte code instructions for network communications, component 2604c contains byte code instructions for the underlying logic of the software application, and component 2604d contains byte code instructions for a graphical user interface for the Mac OS X operating system. In an assembling step 2606a, byte code components 2604a-c could be assembled into byte code 206a comprising a client desktop application for the Windows operating system, because the byte code components 2604a-c respectively contain instructions for a graphical user interface for Windows, network communication, and the underlying program logic. In an alternate assembling step 2606b, byte code components 2604b-d could be assembled into a different byte code 206b comprising a client desktop application for Mac OS X, because the byte code components 2604b-d respectively contain instructions for network communication, the underlying logic, and a graphical user interface for Mac OS X. Assembling steps 2606a-b can thus reuse certain common byte code components 2604a-d in an underlying software application, while integrating some environment or target-specific byte code components to create an overall byte code 206a-b. Creating a second byte code 206a-b through this process allows specific applications to be created while reusing all common byte code components 2604a-d, saving time that would otherwise be spent re-converting or mapping a first byte code 202. In the present example, assembling byte code components 2604a-d can be used to create different target byte code 206a-b for a different operating system environment. Similarly, byte code components 2604a-d can be assembled into target byte codes 206a-b that target different versions of a single byte code interpreter or computer systems with different supporting applications or libraries.

In one exemplary embodiment according the present invention, a byte code converter application on a server performs the step of converting byte code 2602 of a first type 202 into byte code components 2604a-d. Alternate embodiments that would be apparent to one of skill in the art upon reading the following description include byte code converting systems implemented on peer-to-peer networks and other network topologies, as well as over mail, web or other network protocols. Returning to the server embodiment, the server computer can contain a byte code converter and serve second byte code files 206a-b to client computers or other server computers, as described more fully above for FIG. 15. The byte code converter could run as a stand-alone application on a server or as a plug-in, as described in more detail below for FIG. 18. In the present embodiment, a server computer can convert first byte code files 202 into and serve second byte code files 206a-b to other computers over a network. Ideally, the server computer can serve a specific second byte code 206a to one client, while serving a different second byte code 206b to another client, based on factors such as the environment, available applications and operating system of the receiving client computer.

In one exemplary configuration, a client computer initiates a request to the server for a second byte code 206a-b specific to the client. If the request is the first request, then the byte code converter on the server converts the byte code of a first type 202 into byte code components 2604a-c, which are retained on the server computer and assembled into a client-specific second byte code 206a. The specific target byte code 206a is then returned to the client. In a subsequent client request for the same target byte code 206a, the byte code 206a can be assembled from the retained byte code components 2604a-c. If a subsequent client connects to the server computer and requests a different second byte code 206b, the server performs a determination step to see if the client request can be satisfied with target byte code 206a-b comprised of the existing, retained byte code components 2604a-d, or if additional byte code components 2604a-d must be produced to create a client-specific target byte code 206a-b. In this fashion, the present embodiment of the invention allows efficient reuse of common byte code components 2604a-d. In the current example, the server computer determines that the target byte code 206b requires byte code components 2604b-c, which are already retained on the server, and byte code component 2604d, which has not yet been created. The server performs converting step 2602 to produce missing byte code component 2604d from source byte code 202. Byte code component 2604d is then retained by the server and combined with byte code components 2604b-c to form the client-specific byte code of a second type 206b. For example, a server containing CIL source byte code 202 could be configured to convert and serve SWF target byte code 206a containing a Windows-specific interface to a Windows operating system client computer. The server can then reuse the generic old byte code components 2604b-c from one or more earlier byte code conversions and create a new byte code component 2604d to server SWF target byte code 206b to a Mac OS X-specific interface on a Mac OS X operating system client computer.

In an alternate exemplary configuration, a server can convert byte code files 202 into one or more byte code components 2604a-d before receiving a client request requiring those specific components 2604a-d. Upon a client request for a specific target byte code 206a, the server can perform a determination step to decide if the necessary byte code components 2604a-c have already been created and retained among the pre-created byte code components 2604a-c. If the necessary byte code components 2604a-c are present, then the target byte code 206a is assembled. If not, the additional byte code components 2604a-d missing from the target byte code 206a can then be converted from the source byte code 202. Thus, in this configuration, the server can be set up to accommodate the most likely target byte code files 206a-b to be requested by client computers by predicting and compiling anticipated byte code components 2604a-d.

In another embodiment of the invention, after receiving a target byte code 206a-b, a client computer from the client-server example may cache the target byte code 206a-b or individual byte code components 2604a-d. If the client computer requires an updated version of the target byte code 206a-b, it can initiate another request to the server. The server determines which byte code components 2604a-d the client already has by, for example, communicating with the client or referencing a log of byte code component 2604a-d transfers, and optionally converts and sends only the different updated byte code components 2604a-d to the client computer. The client computer can then invoke the byte code application using the cached older byte code components 2604a-d that did not require updating, and updated byte code components 2604a-d for the portion of the byte code application that did require updating. The assembling step 2606a-b may be required on the client end to produce a workable target byte code 206a-b, or the byte code components 2604a-d may already be able to interact without any assembling step 2606a-b. Moreover, if certain byte code components are determined to regularly require updating, the assembly step 2606a-b can be performed to make one or more groups of byte code files that remain substantially static and one or more other groups of byte code files expected to change over time. The static and dynamic groups are sent together to a client as a target byte code 206a-b, but remain replaceable in parts, should the byte code 206a-b require updating. Moreover, in an alternate embodiment, a byte code of a second type 206a-b can be created from only a portion of the source byte code 202 and/or second byte code components 2604a-d and sent to another computer. When additional functionality or methods are needed from the invocation of the resulting byte code 206a-b, a communication can be made to the converting computer to convert additional source byte code 202, or return other byte code components 2604a-d.

In one exemplary embodiment according to the invention, the byte code components 2604a-d retained by a computer after a source byte code conversion step 2602 are stored in a database. For example, a database reference to a byte code component 2604a-d could include such information as the byte code language, the program definition, the client operating system to which the byte code component 2604a-d targets, and other information. The database can later be referenced for easy lookup of byte code components 2604a-d to reuse in assembling specific target byte code files 206a-b. In alternate embodiments, a flat file system or other data storage medium could be used to store byte code components 2604a-d.

Figure 18:
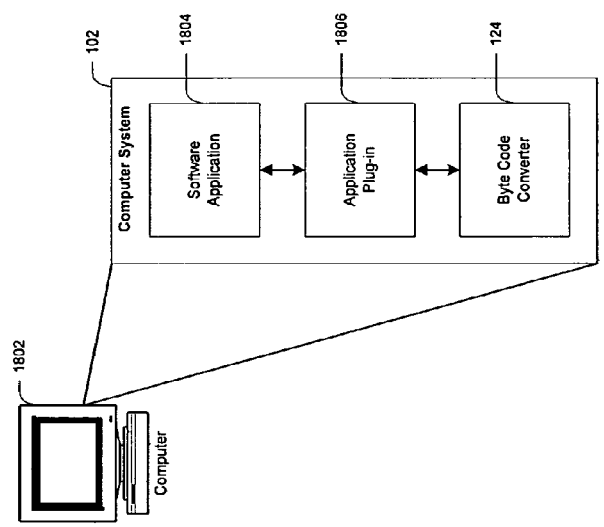
FIG. 18 is a diagram of a computer system comprising a software application utilizing a byte code converter through an application plug-in according to one embodiment of the invention.

FIG. 18 is a diagram of a computer system 102 embodied in a computer 1802 and containing a software application 1804, an application plug-in 1806 and a byte code converter 124 according to one embodiment of the present invention. Suitable computers 1802 can include workstations, client computers and servers. A software application 1804 calls a plug-in application 1806 that invokes a byte code converter 124 to convert first byte code and/or first markup language code into second byte code and/or second markup language code according to the exemplary systems and methods described previously, as well as variations that will become apparent to those of skill in the art after reading this description. A plug-in application 1806 is typically a module or application that adds features or functionality to another application. One advantage of plug-ins 1806 is that they allow users to enhance the functionality of a software application 1804 with only specifically chosen additional features available in different plug-ins 1806. Plug-in applications 1806 may run within a restricted environment in a software application 1804 for security. Software applications 1804 usually provide means for plug-ins 1806 to be registered and protocols for data exchanges with plug-ins 1806 and software applications 1804. Software applications 1804 allowing for plug-ins 1806 typically provide a plug-in Application Programming Interface (API) to allow software developers to create custom plug-in applications 1806. Examples of web browser applications 1804 allowing for plug-ins 1806 include Internet Explorer, Mozilla Firefox, and Netscape Navigator. Examples of web server applications 1804 allowing for plug-ins 1806 (often called "modules" in this context) include IIS and the Apache Software Foundation's Apache HTTP Server. In one embodiment according to the present invention, a web server application 1804 may offer markup language files and/or byte code files for download by web browser clients. A web server plug-in 1806 can be invoked in response to a client browser request to dynamically convert markup language code and/or byte code to different types of markup language and/or byte code in accordance with various embodiments of the present invention as previously described. Additionally, a web server application 1804 and/or web server plug-in 1806 to provide authentication services in connection with transmitted byte code and/or markup language files. For example, an IIS web server 1804 may distribute a converted SWF byte code file to a client web browser. As a prerequisite to execution in the client web browser, the converted SWF byte code file may contain instructions to contact the IIS web server 1804 and authenticate itself. Upon successful authentication, the SWF byte code can then execute.

Many types of applications 1804 such as graphics applications, like Adobe® Acrobat®, Adobe® Illustrator®, and integrated development environments, and multimedia servers, such as audio and video streaming servers, similarly allow for the use of plug-ins 1806 (ADOBE, PHOTOSHOP, and ILLUSTRATOR are either registered trademarks or trademarks of Adobe Systems Incorporated). A plug-in application 1806 may comprise an application that accesses a separate byte converter application 124. Alternately, a plug-in application 1806 may be comprised within the same larger application as byte converter application 124.

Also, a software application 1804 may be modified with software application extensions comprising similar functionality to a plug-in 1806. A software extension is typically created using extension APIs for a software application 1804 and allows modifications or additions to the functionality of an application, usually with fewer restrictions than an application plug-in 1806. A software extension to a software application 1804 could contain or invoke a byte code converter 124 for converting byte code and markup language files, as previously described.

Figure 25:
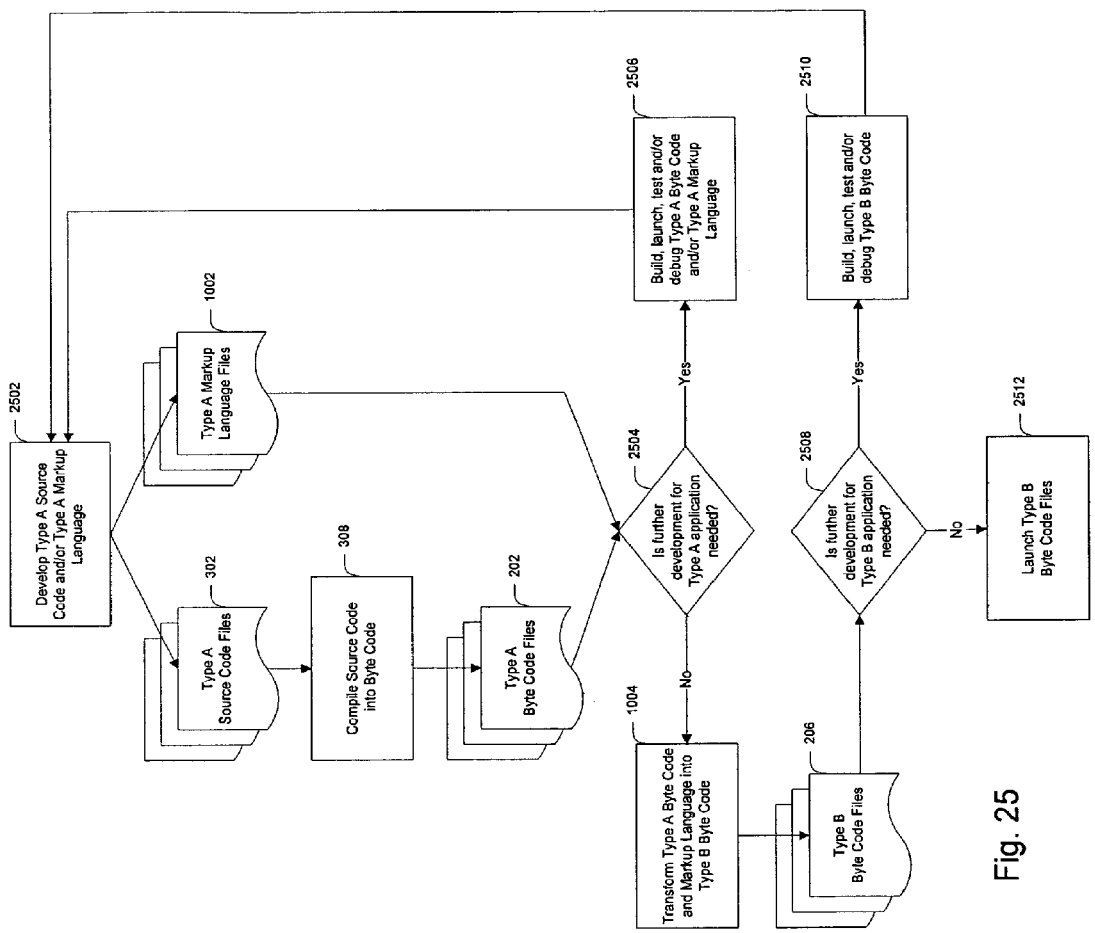
FIG. 25 is an operational flow diagram illustrating a method of developing source code of a first type and/or markup language of a first type in an integrated development environment and producing byte code of a second type according to one embodiment of the invention.

FIG. 25 illustrates an exemplary scenario utilizing byte code conversion within a software application. FIG. 25 is an operational flow diagram illustrating one embodiment in accordance with the invention of developing source code of a first type 302 and optionally markup language code of a first type 1002 in an integrated development environment and producing target byte code of a second type 206. In a developing step 2502, source code of a first type 302 and optionally markup language of a first type 1002 can be programmed. Source code 302 and markup language 1002 can be developed in an integrated development environment (IDE), a software application typically consisting of a source code editor, a compiler and/or interpreter, build tools, a debugger, and other useful programming tools. Exemplary IDEs include Visual Studio® and Eclipse from the Eclipse Foundation (VISUAL STUDIO is a registered trademark of Microsoft Corp.). In one example according to the present invention, a developer can develop C# source code 302 and XAML markup language code 1002 in Visual Studio. Alternately, source code files 302 and/or markup language files 1002 can be created elsewhere and opened or linked within Visual Studio. In compiling step 308, the source code files of a first type 302 are compiled into byte code of a first type 202. For example, C# source code 302 can be compiled in Visual Studio into CIL byte code 202. In an alternate example, Java source code 302 can be compiled in Eclipse into Java byte code 202. In step 2504, if further development is needed for the native application of a first type (comprising first byte code 202 and optional first markup language 1002) under development, a developer or an automated IDE process can take further development steps 2506, such as building, launching, testing, and debugging the application. Typically, such testing reveals errors or areas for improvement that can be addressed by repeating a development step 2502, wherein a developer can enhance the original source code 302 or markup language files 1002 and continuing through the steps as described above. Returning to step 2504, if the byte code 202 requires no further development, or the developer wishes to test what has been developed at that point, the source first byte code 202 can be transformed in a transforming step 1004 into byte code of a second type 206 as previously described in this description. In one exemplary embodiment, this transformation step 1004 is performed by a developer selecting the target byte code 206 as the development target and deselecting the native byte code 202 target in an IDE. The selection of a new development target in the IDE invokes computer instructions to transform source code 302 into source byte code 202 and then to target byte code 206 as described above. In an alternate embodiment, the transformation step 1004 can occur as a post-build process, after the IDE has finished compilation of the first source code 302 into first byte code 202. Additionally, first markup language files 1002 can also be transformed with the source byte code 202 into target byte code 206. The first markup language files 1002 can also be converted in a converting step into markup language files of a second type as previously described in this description.

The byte code transforming step 1004 and markup language transforming step can be performed within an IDE. In one exemplary embodiment, a byte code converter software application takes the form of an application plug-in for an IDE. Upon compiling and producing native byte code 202 and markup language files 1002, the IDE can communicate instructions to invoke the byte code converter plug-in to carry out the transformation step 1004. For example, both Visual Studio and Eclipse have plug-in architectures that enable developers to write software application plug-ins that can be invoked from within the IDE. Turning to Visual Studio, C# source code 302 can be natively compiled by the Visual Studio IDE into CIL byte code 202 and packaged with XAML markup language code 1002 to form a .Net application. Following automatic instructions or user input, Visual Studio can then invoke a byte code converting plug-in according to the present invention, which can convert the CIL byte code 202 and XAML markup language code 1002 into target SWF byte code and optionally one or more target markup language files. Alternately, computer instructions containing logic to convert byte code in transformation step 1004 may be natively built in to an IDE, which could invoke the transformation instructions directly from the application. In a preferred embodiment, a menu command, graphical button or build instruction in the Visual Studio IDE graphical interface invokes or designates the execution of the byte code converting IDE plug-in or native computer instructions. One advantage of allowing for development and testing in one language, and producing a target byte code 206 in another language as part of a build process is that debugging and coding in the native environment can be more useful and efficient. For example, developers might have great expertise at the source code 302 language and source byte code 202 instructions, but very little experience with the target byte code 206 instruction set or intermediate language.

In optional step 2508, if further development is needed for the converted target application of a second type (comprising second byte code 206 and optional markup language files), a developer or an automated IDE process can take further development steps 2510, such as building, launching, testing, and debugging the converted application. Similar to the steps of testing a native application of a first type, if testing reveals errors or possible improvements, development step 2502 can be repeated with all subsequent development steps proceeding again as described above. In the case that no further development is needed, an optional step 2512 can be performed, wherein the target byte code of a second type 206 may be launched. For example, if SWF byte code 206 is created in an exemplary byte code converter plug-in, a live instance of execution of the SWF byte code 206 may be displayed. Additionally, the resulting byte code 206 may be displayed to a developer within an IDE, so that a developer may review and edit the created target byte code 206 further.

In an alternate embodiment according to the present invention, the transformation step 1004 can take place at any time during the development of the first source code 302 or markup language 1002. Many conventional IDEs provide for a "preview" function, in which at least some portion of source code 302 or markup language 1002 is compiled during development and before explicit compilation into first byte code 202. Typically, a background computer process can compile incremental portions of source code 302 or markup language 1002 as the files are developed. When a developer invokes a preview command in the IDE, or if an automatic preview window in an IDE is activated, at least some portion of the compiled byte code 202 and/or markup language code 1002 is displayed. In the present embodiment according to the invention, the preview process includes the additional step of converting at least a portion of the source byte code 202 or markup language 1002 into target second byte code 206 and/or second markup language as described previously. The preview of an application or display executing converted byte code 206 and/or markup language code can be invoked explicitly, such as with a developer pressing a "preview" graphical IDE button, or implicitly, such as every time first source code file 302 is saved or edited. For example, if a developer working with C# source code 302 and XAML markup language code 1002 in Visual Studio invoked the preview function according to the invention, a byte code converting plug-in could dynamically create a SWF byte code file 206 from at least a portion of the C# source code 302 and XAML markup language 1002 using steps described above. The resulting SWF byte code file 206 could then be executed and displayed graphically in a Visual Studio preview window. The byte code transformation step 1004 can run as a process that continually creates target byte code 206 output, or incrementally transforms source byte code 202 when the preview functionality requires updated target byte code 206.

In yet another embodiment according to the invention, the transforming step 1004 can adjust the target platform for the created second byte code 206. Byte code such as SWF can "target" a certain computer platform, such as the Windows, Mac OS X or Linux platforms, and display graphical objects in the application in a manner consistent with the platform. A developer or automatic IDE process can select an appropriate target platform, and step 1004 will transform first byte code 202 into a second byte code 206 targeting one or more specific computer platforms. Moreover, some graphical IDEs include visual object editors containing a graphical user interface for programming an application. Typically, a developer can manipulate application objects, such as display items or controls, using the visual editor and without resorting to typing text source code. An IDE visual object editor conventionally uses some similar functionality to the "preview" functionality described above, in that graphical controls and display items are laid out in an analogous manner to how they will appear in a compiled native byte code application. The present embodiment of the invention extends the visual editor to graphically display visual objects as they will substantially appear in the converted target byte code 206. For example, if a developer is programming C# source code 302 in Visual Studio and intending to target SWF byte code 206, the Visual Studio visual object editor will display graphical objects as they will substantially appear in an executing instance of SWF byte code 206, and not like an application executing native compiled CIL byte code 202, which typically appears in accordance with the native System.Windows.Forms, System.Drawing, and System.Drawing.Drawing2D APIs from the .Net Framework.

In a further embodiment, if the first source code 302 is developed against development libraries of a second type, such as those described for FIG. 3, the native compiled first byte code 202 can utilize one or more display elements to appear as will the second byte code 206. For example, C# source code 302 developed against a SWF target development library can be compiled in Visual Studio to a first CIL byte code 202. However, the resulting CIL byte code 202 can appear when executed to display objects in substantially the same manner as an analogous SWF byte code application. The advantage of this embodiment is that a developer can develop a byte code application in a native first byte code format and observe the application display as it will when converted to a second byte code 206. This way, a developer can perform nearly all program development using only native source code 302, markup language 1002, and byte code 202, and wait until the end of the development process to create a target byte code of a different type 206.

While various embodiments of the invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of converting byte code of a first type into byte code of a second type, the method comprising:
   receiving a first byte code, wherein the first byte code is compiled from the source code comprising Common Language Infrastructure programming language;
   converting said first byte code into an intermediate language format;
   parsing the intermediate language format to create an intermediate data structure wherein the intermediate data structure represents the syntactic structure of the first byte code;
   converting markup language into an object graph; and,
   converting the object graph and the intermediate data structure into a second byte code, wherein the source code is a C# source code, the markup language is an XML markup language or an XML-based markup language and the byte code of the first type is a Common Intermediate Language byte code.

* * * * *